US012766796B2

(12) United States Patent
Roy

(10) Patent No.: US 12,766,796 B2
(45) Date of Patent: Oct. 20, 2026

(54) METHODS FOR DESIGNING COMPOSITE MATERIALS WITH IMPROVED TOUGHNESS

(71) Applicant: The Board of Trustees of The University of Alabama, Tuscaloosa, AL (US)

(72) Inventor: Samit Roy, Northport, AL (US)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 1015 days.

(21) Appl. No.: 17/984,335

(22) Filed: Nov. 10, 2022

(65) Prior Publication Data

US 2023/0219304 A1 Jul. 13, 2023

Related U.S. Application Data

(60) Provisional application No. 63/297,900, filed on Jan. 10, 2022.

(51) Int. Cl.

| | |
|---|---|
| ***B29C 70/04*** | (2006.01) |
| ***B29K 101/00*** | (2006.01) |
| ***B29K 305/00*** | (2006.01) |
| ***B82Y 30/00*** | (2011.01) |
| ***C08J 5/00*** | (2006.01) |
| ***C08J 5/04*** | (2006.01) |

(52) U.S. Cl.

CPC .............. *B29C 70/04* (2013.01); *B82Y 30/00* (2013.01); *C08J 5/005* (2013.01); *C08J 5/041* (2013.01); *B29K 2101/00* (2013.01); *B29K 2305/00* (2013.01); *B29K 2995/0045* (2013.01); *B29K 2995/0046* (2013.01); *B29K 2995/0063* (2013.01); *B29K 2995/0089* (2013.01); *C08J 2300/12* (2013.01)

(58) Field of Classification Search

CPC ........ B29C 70/04; B29C 70/025; B82Y 30/00; C08J 5/005; C08J 5/041; C08J 2300/12; C08J 2363/00; C08J 5/042; B29K 2101/00; B29K 2305/00; B29K 2995/0045; B29K 2995/0046; B29K 2995/0063; B29K 2995/0089

See application file for complete search history.

(56) References Cited

U.S. PATENT DOCUMENTS

| | | | |
|---|---|---|---|
| 8,293,812 | B2 | 10/2012 | Martin |
| RE45,991 | E | 5/2016 | Preisler et al. |

(Continued)

FOREIGN PATENT DOCUMENTS

| | | | |
|---|---|---|---|
| EP | 2868690 | A1 | 5/2015 |
| WO | 2015184223 | A1 | 12/2015 |

OTHER PUBLICATIONS

Tang, Youhong, et al. "Interlaminar fracture toughness and CAI strength of fibre-reinforced composites with nanoparticles—A review." Composites Science and Technology 86 (2013): 26-37. (Year: 2013).*

(Continued)

*Primary Examiner* — Saif A Alhija

(74) *Attorney, Agent, or Firm* — Meunier Carlin & Curfman LLC

(57) ABSTRACT

Disclosed herein are methods for designing composite materials with improved toughness.

18 Claims, 8 Drawing Sheets

(56) References Cited

U.S. PATENT DOCUMENTS

| | | | | |
|---|---|---|---|---|
| 2004/0016557 | A1* | 1/2004 | Keshavan | C22C 29/08<br>172/701.3 |
| 2005/0262774 | A1* | 12/2005 | Eyre | E21B 10/5735<br>51/307 |
| 2006/0057421 | A1* | 3/2006 | Maria | C04B 35/117<br>428/688 |
| 2021/0262051 | A1* | 8/2021 | Arai | C21D 8/10 |

OTHER PUBLICATIONS

Roy S et al. Effect of Particle Size on Mixed-Mode Fracture of Nanographene Reinforced Epoxy and Mode I Delamination of its Carbon Fiber Composite, Composite Structures, 2017, 181, 23 pages.

* cited by examiner

METHODS FOR DESIGNING COMPOSITE MATERIALS WITH IMPROVED TOUGHNESS

CROSS-REFERENCE TO RELATED APPLICATIONS

This application claims the benefit of priority to U.S. Provisional Application No. 63/297,900, filed Jan. 10, 2022, which is hereby incorporated herein by reference in its entirety.

STATEMENT OF GOVERNMENT SUPPORT

This invention was made with government support under Grant Number FA9550-18-1-0084 awarded by the Air Force Office of Scientific Research. The government has certain rights in the invention.

BACKGROUND

The use of reinforcing nanoparticles can significantly improve stiffness and fracture toughness in brittle matrix materials and their composites. However, in most cases it has been observed that there is an optimum concentration of reinforcing nanoparticles that maximizes fracture toughness, and this is quickly followed by a degradation in fracture toughness due to particle agglomeration when the optimum concentration of nanoparticles (i.e., weight fraction of the nanoparticles relative to the matrix material) is exceeded. To complicate matters further, not only the nanoparticle weight fraction but also the nanoparticle size plays an important role in maximizing the toughness of the matrix material. Currently, the identification of the optimum nanoparticle size and weight fraction for maximizing fracture toughness is performed through lengthy and costly trial-and-error based fracture experiments. Improved methods for identifying the optimum nanoparticle size and weight fraction for maximizing fracture toughness are needed. The methods discussed herein addresses these and other needs.

SUMMARY

In accordance with the purposes of the disclosed compositions, methods, and systems as embodied and broadly described herein, the disclosed subject matter relates to methods for designing composite materials with improved toughness.

For example, disclosed herein are methods for designing a proposed isotropic composite material with a particular fracture toughness or a proposed orthotropic composite material with a particular delamination toughness, the method comprising:

- receiving, using a processing device, a measured fracture toughness value for a brittle matrix material;
- receiving, using the processing device, a plurality of measured fracture toughness values of a plurality of isotropic composite materials or a plurality of measured delamination toughness values of a plurality of orthotropic composite materials;
- wherein the plurality of isotropic composite materials each comprise a first reinforcing material dispersed throughout the brittle matrix material;
- wherein the plurality of orthotropic materials each comprise the first reinforcing material and a second reinforcing material dispersed throughout the brittle matrix material;

- wherein the first reinforcing material comprises a plurality of particles;
- wherein the second reinforcing material comprises a plurality of fibers;
- wherein, for each of the plurality of isotropic composite materials, the first reinforcing material has a median particle size and a median particle thickness, and each of the isotropic composite materials includes the first reinforcing material at a volume fraction and a number density, and wherein the plurality of isotropic materials each has a different volume fraction, number density, median particle size, median particle thickness, or combination thereof;
- wherein, for each of the plurality of orthotropic composite materials, the first reinforcing material has a median particle size and a median particle thickness, and each of the orthotropic composite materials includes the first reinforcing material at a volume fraction and a number density, and the plurality of orthotropic materials each has a different volume fraction, number density, median particle size, median particle thickness, or combination thereof;
- optionally storing, using the processing device, the measured fracture toughness value for the brittle material, and the plurality of measured fracture toughness values of the plurality of isotropic composite materials or the plurality of measured delamination toughness values of the plurality of orthotropic composite materials; and
- determining, using the processing device, the median particle size and volume fraction that achieves the particular fracture toughness in the proposed isotropic composite material or the particular delamination toughness in the proposed orthotropic composite material using a fracture mechanics based model that incorporates the effects of crack-tip shielding due to microcracking induced by the first reinforcing material and local toughness degradation in a fracture process zone.

In some examples, the methods further comprise measuring the fracture toughness of the brittle matrix material. In some examples, the methods further comprise measuring the fracture toughness of the plurality of isotropic composite materials or measuring the delamination toughness of the plurality of orthotropic composite materials as a function of median particle size and volume fraction. In some examples, the methods further comprise making the plurality of isotropic composite materials and/or the plurality of orthotropic composite materials. In some examples, the plurality of isotropic composite materials includes at least nine different isotropic composite materials or wherein the plurality of orthotropic composite materials includes at least nine different isotropic composite materials. In some examples, the particular fracture toughness of proposed isotropic composite material is the maximum fracture toughness or wherein the particular delamination toughness of the proposed orthotropic composite material is the maximum fracture toughness.

Also disclosed herein are methods for designing a proposed isotropic composite material with a particular mode I fracture toughness or a proposed orthotropic composite material with a particular mode I delamination toughness, the methods comprising:

- measuring the mode I fracture toughness of a brittle matrix material, wherein the brittle matrix material has an elastic modulus;
- measuring the mode I facture toughness of at least nine different isotropic composite materials;

wherein each isotropic composite material comprises a first reinforcing material dispersed throughout the brittle matrix material, wherein the first reinforcing material comprises a plurality of particles;

wherein, for each of the at least nine different isotropic materials, the first reinforcing material has a median particle size and a median particle thickness;

wherein each of the nine different isotropic materials includes the first reinforcing material at a volume fraction and a number density; wherein the at least nine different isotropic composite materials includes at least three sets of isotropic composite materials;

wherein, for each set, the first reinforcing material has a particular median particle size, and each set includes at least three different isotropic composite materials, each having a particular volume fraction of the first reinforcing material having the particular median particle size, wherein the particular volume fraction is different for each of the at least three different isotropic composite materials in the set, such that each set of isotropic composite materials includes at least three different volume fractions of the first reinforcing material having the particular median particle size;

wherein the particular median particle size is different for each of the at least three sets of isotropic composite materials, such that the at least nine different isotropic composite materials includes at least three different median particle sizes;

using the measured mode I fracture toughness of the brittle matrix material and the measured mode I facture toughness of at least nine isotropic composite material samples in Equation (A) below to determine power-law parameters β and q:

$$\left(K_{IC\ brittle}^2 \big/ K_{IC\ composite}^2\right) = (1 - \beta n^q) \quad \text{(A)}$$

wherein $K_{IC\ brittle}$ is measured value of the mode I toughness for the brittle matrix material;

$K_{IC\ composite}$ is the measured value of the mode I toughness for the isotropic composite materials; and n is the number density of the first reinforcing material in the isotropic composite materials;

and for designing the proposed isotropic composite material, using the determined power-law parameters β and q and the measured value of the mode I toughness of the brittle matrix material in equation (B) below to determine the volume fraction, the median particle size, and the median particle thickness of the first reinforcing material that achieves the particular mode I fracture toughness for the proposed isotropic composite material:

$$K_{IC\ composite} = K_{IC\ brittle}(1 - V_{freinforc})\left(\frac{1}{\sqrt{1 - \beta\left(\frac{V_{freinforc}}{l^2 t}\right)^q}}\right) \quad \text{(B)}$$

wherein $K_{IC\ brittle}$ is measured value of the mode I toughness for the brittle matrix material;

$V_{freinforc}$ is the volume fraction of the first reinforcing material;

l is the median particle size of the first reinforcing material;

t is the median particle thickness of the first reinforcing material; and $K_{IC\ composite}$ is the particular mode I fracture toughness for the proposed isotropic composite material;

or for designing the proposed orthotropic composite material:

the proposed orthotropic composite material comprising the first reinforcing material and a second reinforcing material dispersed throughout the brittle matrix material;

the second reinforcing material comprising a plurality of fibers and having an elastic modulus, a shear modulus, and a Poisson's ratio;

the proposed orthotropic composite material comprising the second reinforcing material and the brittle matrix material each at a particular volume fraction;

using the determined power-law parameters § and q and the measured value of the mode I toughness of the brittle matrix material in the equations below to determine the particular volume fraction, the median particle size, and the median particle thickness of the first reinforcing material that achieves the particular mode I delamination toughness for the proposed orthotropic composite material:

$$G_{IC\ composite} = K_{IC\ brittle}(1 - V_{fiber})^2\left(\frac{1}{2E_1E_2}\right)^{1/2}\left[\left(\frac{E_1}{E_2}\right)^{1/2} + \left(\frac{E_1 - 2\gamma_{12}G_{12}}{2G_{12}}\right)\right]^{1/2}$$

$$E_1 = E_f V_f + E_m V_m$$

$$E_2 = \frac{E_f E_m}{E_f V_m + E_m V_{fiber}}$$

$$\gamma_{12} = \gamma_f V_{fiber} + \gamma_m V_m$$

$$G_{12} = \frac{G_f G_m}{G_f V_m + G_m V_{fiber}}$$

$$E_m = E_{brittle}\left(1 - \beta\left(\frac{V_{freinforc}}{l^2 t}\right)^q\right)$$

wherein $G_{IC\ composite}$ is the particular mode I delamination toughness for the proposed orthotropic composite material;

$K_{IC\ brittle}$ is measured value of the mode I toughness for the brittle matrix material;

$V_{fiber}$ is the particular volume fraction of the second reinforcing material in the proposed orthotropic composite material;

$E_f$ is the elastic modulus of the second reinforcing material;

$V_m$ is the particular volume fraction of the brittle matrix material in the proposed orthotropic composite material;

$\gamma_f$ is Poisson's ratio of the second reinforcing material;

$\gamma_m$ is Poisson's ratio of the brittle matrix material;

$G_f$ is the shear modulus of the second reinforcing material;

$G_m$ is the shear modulus of the brittle matrix material;

$E_{brittle}$ is the elastic modulus of the brittle matrix material;

$V_{freinforc}$ is the volume fraction of the first reinforcing material;

l is the median particle size of the first reinforcing material; and t is the median particle thickness of the first reinforcing material.

In some examples, the methods comprise designing the proposed isotropic composite material and the particular mode I fracture toughness is the maximum mode I fracture toughness for the proposed isotropic composite material. In some examples, the methods comprise designing the proposed orthotropic composite material and the particular mode I delamination toughness is the maximum mode I delamination toughness for the proposed orthotropic composite material.

In some examples, the methods further comprise determining the elastic modulus of the second reinforcing material, Poisson's ratio of the second reinforcing material, Poisson's ratio of the brittle matrix material, the shear modulus of the second reinforcing material, the shear modulus of the brittle matrix material, or a combination thereof.

In some examples, the methods further comprise determining the elastic modulus of the brittle matrix material.

In some examples, the methods further comprise determining the volume fraction of the first reinforcing material in each of the at least nine isotropic composite materials. In some examples, the volume fraction of the first reinforcing material is determined using Equation (C):

$$V_{freinforc} = \frac{\rho_{brittle} w_{reinforc}}{\rho_{brittle} w_{reinforc} + \rho_{reinforc}} \tag{C}$$

wherein $V_{freinforc}$ is the volume fraction of the first reinforcing material in the isotropic composite material;

$\rho_{brittle}$ is the mass density of the brittle matrix material;

$w_{reinforc}$ is the weight fraction of the first reinforcing material in the isotropic composite material; and $\rho_{reinforc}$ is the mass density of the first reinforcing material.

In some examples, the methods further comprise determining the mass density of the brittle matrix material, the weight fraction of the first reinforcing material in the isotropic composite material, the mass density of the first reinforcing material, or a combination thereof.

In some examples, the methods further comprise determining the number density of the first reinforcing material in each of the at least nine isotropic composite materials. In some examples, the number density of the first reinforcing material is determined using equation (D):

$$n = \frac{V_{freinforc}}{V_p} = \frac{V_{freinforc}}{tl^2} \tag{D}$$

wherein $V_{freinforc}$ is the volume fraction of the first reinforcing material in the isotropic composite material;

$V_p$ is median volume of the plurality of particles comprising the first reinforcing material;

t is the median thickness of the plurality of particles comprising the first reinforcing material; and l is the median particle size of the plurality of particles comprising the first reinforcing material.

In some examples, the methods further comprise determining the median particle size of the plurality of particles comprising the first reinforcing material, the median thickness of the plurality of particles comprising the first reinforcing material, the median volume of the plurality of particles comprising the first reinforcing material, or a combination thereof.

In some examples, the mode I fracture toughness of the brittle matrix material and/or the at least nine different isotropic composite materials are measured according to ASTM D5045 standard test procedure.

In some examples, the methods further comprise making the at least nine different isotropic composite materials.

In some examples, the methods are carried out at least in part on one or more computing devices.

In some examples, the brittle matrix material comprises a polymer or glass-like material. In some examples, the brittle matrix material comprises a polymer. In some examples, the brittle matrix material comprises an epoxy.

In some examples, the plurality of particles of the first reinforcing material and/or the plurality of fibers of the second reinforcing material independently comprise a metal oxide, a metal carbide, a carbonaceous or graphitic material, silica based materials, or a combination thereof. In some examples, the plurality of particles of the first reinforcing material and/or the plurality of fibers of the second reinforcing material independently comprise a graphitic material. In some examples, the plurality of particles of the first reinforcing material comprise graphene.

In some examples, the plurality of particles of the first reinforcing material have a flat, plate like 2D structure. In some examples, the plurality of particles of the first reinforcing material have a median particle size of from 50 nanometers to 50 micrometers. In some examples, the plurality of particles of the first reinforcing material have a median particle size of from 100 nanometers to 15 micrometers. In some examples, the plurality of particles of the first reinforcing material have a median thickness of from 5 nm to 25 nm. In some examples, the volume fraction of the first reinforcing material is from greater than 0 to 0.010. In some examples, the number density of the first reinforcing material is from greater than 0 to $1\times10^9$ particles/$mm^3$.

In some examples, the first reinforcing material and/or the second reinforcing material is/are dispersed substantially uniformly throughout the brittle matrix material.

Also disclosed herein are the proposed isotropic composite materials and/or the proposed orthotropic composite materials designed by any of the methods disclosed herein.

Also disclosed herein are objects comprising any of the proposed isotropic composite materials and/or any of the proposed orthotropic composite materials disclosed herein. In some examples, the object comprises at least a portion of a vehicle.

Also disclosed herein are articles of manufacture comprising any of the proposed isotropic composite materials and/or any of the proposed orthotropic composite materials disclosed herein. In some examples, the article comprises at least a portion of a vehicle.

Also disclosed herein are methods of use of any of the proposed isotropic composite materials and/or any of the proposed orthotropic composite materials disclosed herein. In some examples, the method comprises using the proposed isotropic composite material and/or the proposed orthotropic composite material in an aerospace, automotive, sporting good, boating, and/or wind energy application. In some examples, the method comprises using the proposed isotropic composite material and/or the proposed orthotropic composite material in an aerospace material system. In some examples, the method comprises using the proposed isotropic composite material and/or the proposed orthotropic composite material in an aerospace platform, such as an airframe, a space vehicle, or a satellite. In some examples, the method comprises using the proposed isotropic composite material and/or the proposed orthotropic composite material in a transportation application, a defense application, or a consumer product Additional advantages of the disclosed compositions, systems, and methods will be set forth in part in the description which follows, and in part will be obvious from the description. The advantages of the disclosed compositions, systems, and methods will be realized and attained by means of the elements and combinations particularly pointed out in the appended claims. It is to be understood that both the foregoing general description and the following detailed description are exemplary and explanatory only and are not restrictive of the disclosed systems and methods, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

DETAILED DESCRIPTION

Figure 1:
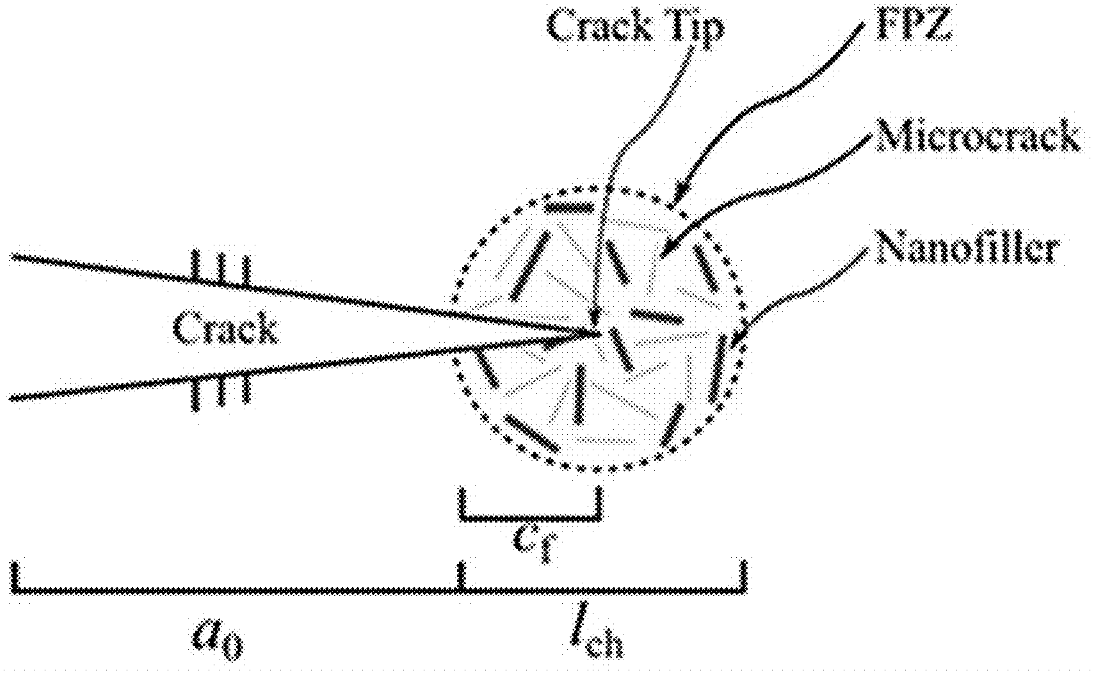
FIG. 1. Fracture Process Zone (FPZ) with damage for thermoset polymer with randomly dispersed graphene nanoplatelets.

The compositions, methods, and systems described herein may be understood more readily by reference to the following detailed description of specific aspects of the disclosed subject matter and the Examples included therein.

Before the present compositions, methods, and systems are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings.

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

Values can be expressed herein as an "average" value. "Average" generally refers to the statistical mean or median value.

By "substantially" is meant within 5%, e.g., within 4%, 3%, 2%, or 1%.

"Exemplary" means "an example of" and is not intended to convey an indication of a preferred or ideal embodiment. "Such as" is not used in a restrictive sense, but for explanatory purposes.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

The term "(co)polymer" includes homopolymers, copolymers, or mixtures thereof. The term, "copolymer," as used herein, includes polymers having two types of monomers, those having three types of monomers, and those having more than three types of monomers.

As used herein, "(meth)acrylic acid" means methacrylic acid and/or acrylic acid. Likewise, "(meth)acrylate" means methacrylate and/or acrylate.

"Phase," as used herein, generally refers to a region of a material having a substantially uniform composition which is a distinct and physically separate portion of a heterogeneous system. The term "phase" does not imply that the material making up a phase is a chemically pure substance, but merely that the chemical and/or physical properties of the material making up the phase are essentially uniform throughout the material, and that these chemical and/or physical properties differ significantly from the chemical and/or physical properties of another phase within the material. Examples of physical properties include density, thickness, aspect ratio, specific surface area, porosity, and dimensionality. Examples of chemical properties include chemical composition.

Disclosed herein are for designing a proposed isotropic composite material with a particular fracture toughness or a proposed orthotropic composite material with a particular delamination toughness, the methods comprising receiving, using a processing device, a measured fracture toughness value for a brittle matrix material. In some examples, the methods can further comprise measuring the fracture toughness of the brittle matrix material. In some examples, the methods can further comprise inputting or transmitting the measured fracture toughness of the brittle matrix material to the processing device.

The methods further comprise receiving, using the processing device, a plurality of measured fracture toughness values of a plurality of isotropic composite materials or a plurality of measured delamination toughness values of a plurality of orthotropic composite materials. In some examples, the methods can further comprise measuring the fracture toughness of the plurality of isotropic composite materials or measuring the delamination toughness of the plurality of orthotropic composite materials as a function of median particle size and volume fraction. In some examples, the methods can further comprise inputting or transmitting the plurality of measured fracture toughness values of a plurality of isotropic composite materials or the plurality of measured delamination toughness values of a plurality of orthotropic composite materials to the processing device.

The plurality of isotropic composite materials each comprise a first reinforcing material dispersed throughout the brittle matrix material, and the first reinforcing material comprises a plurality of particles. For each of the plurality of isotropic composite materials, the first reinforcing material has a median particle size and a median particle thickness, and each of the isotropic composite materials includes the first reinforcing material at a volume fraction and a number density, and wherein the plurality of isotropic materials each has a different volume fraction, number density, median particle size, median particle thickness, or combination thereof.

In some examples, the plurality of isotropic composite materials includes at least nine different isotropic composite materials (e.g., 9 or more, 10 or more, 11 or more, 12 or more, 13 or more, 14 or more, 15 or more, 20 or more, 25 or more, 30 or more, 35 or more, 40 or more, 45 or more, 50 or more, 60 or more, 70 or more, 80 or more, 90 or more, or 100 or more). In some examples, the plurality of isotropic composite materials includes 100 or less different isotropic composite materials (e.g., 90 or less, 80 or less, 70 or less, 60 or less, 50 or less, 45 or less, 40 or less, 35 or less, 30 or less, 25 or less, 20 or less, 15 or less, 14 or less, 13 or less, 12 or less, 11 or less, or 10 or less). In some examples, the plurality of isotropic composite materials includes nine different isotropic composite materials.

In some examples, the methods can further comprise making the plurality of isotropic composite materials.

The plurality of orthotropic materials each comprise the first reinforcing material and a second reinforcing material dispersed throughout the brittle matrix material, and the second reinforcing material comprises a plurality of fibers. For each of the plurality of orthotropic composite materials, the first reinforcing material has a median particle size and a median particle thickness, and each of the orthotropic composite materials includes the first reinforcing material at a volume fraction and a number density, and the plurality of orthotropic materials each has a different volume fraction, number density, median particle size, median particle thickness, or combination thereof.

In some examples, the plurality of orthotropic composite materials includes at least nine different orthotropic composite materials (e.g., 9 or more, 10 or more, 11 or more, 12 or more, 13 or more, 14 or more, 15 or more, 20 or more, 25 or more, 30 or more, 35 or more, 40 or more, 45 or more, 50 or more, 60 or more, 70 or more, 80 or more, 90 or more, or 100 or more). In some examples, the plurality of orthotropic composite materials includes 100 or less different orthotropic composite materials (e.g., 90 or less, 80 or less, 70 or less, 60 or less, 50 or less, 45 or less, 40 or less, 35 or less, 30 or less, 25 or less, 20 or less, 15 or less, 14 or less, 13 or less, 12 or less, 11 or less, or 10 or less). In some examples, the plurality of orthotropic composite materials includes nine different orthotropic composite materials.

In some examples, the methods can further comprise making the plurality of orthotropic composite materials.

The methods can optionally further comprise storing, using the processing device, the measured fracture toughness value for the brittle material, and the plurality of measured fracture toughness values of the plurality of isotropic composite materials or the plurality of measured delamination toughness values of the plurality of orthotropic composite materials.

The methods further comprise determining, using the processing device, the median particle size and volume fraction that achieves the particular fracture toughness in the proposed isotropic composite material or the particular delamination toughness in the proposed orthotropic composite material using a fracture mechanics based model that incorporates the effects of crack-tip shielding due to microcracking induced by the first reinforcing material and local toughness degradation in a fracture process zone. In some examples, the particular fracture toughness of proposed isotropic composite material is the maximum fracture toughness or wherein the particular delamination toughness of the proposed orthotropic composite material is the maximum fracture toughness (e.g., the methods comprise determining the median particle size and volume fraction that achieves the maximum fracture toughness in the proposed isotropic composite material or the maximum delamination toughness in the proposed orthotropic composite material). In some examples, the methods can further comprise outputting or transmitting the median particle size and volume fraction that achieves the particular fracture toughness in the proposed isotropic composite material or the particular delamination toughness in the proposed orthotropic composite material.

Also disclosed herein are methods for designing a proposed isotropic composite material with a particular mode I fracture toughness or a proposed orthotropic composite material with a particular mode I delamination toughness, the methods comprising measuring the mode I fracture toughness of a brittle matrix material (e.g., in the absence of any reinforcing material), wherein the brittle matrix material has an elastic modulus. In some examples, the methods can further comprise determining the elastic modulus of the brittle matrix material.

The methods further comprise measuring the mode I facture toughness of at least nine different isotropic composite materials (e.g., 9 or more, 10 or more, 11 or more, 12 or more, 13 or more, 14 or more, 15 or more, 20 or more, 25 or more, 30 or more, 35 or more, 40 or more, 45 or more, 50 or more, 60 or more, 70 or more, 80 or more, 90 or more, or 100 or more), wherein each isotropic composite material comprises a first reinforcing material dispersed throughout the brittle matrix material and the first reinforcing material comprises a plurality of particles.

The mode I fracture toughness of the brittle matrix material and/or the at least nine different isotropic composite materials can be measured according to methods known in the art. In some examples, the mode I fracture toughness of the brittle matrix material and/or the at least nine different isotropic composite materials can be measured according to ASTM D5045 standard test procedure.

For each of the at least nine different isotropic materials, the first reinforcing material has a median particle size and a median particle thickness and each of the nine different isotropic materials includes the first reinforcing material at a volume fraction and a number density. For example, the volume fraction, the number density, the median particle size, or a combination thereof is different for each of the nine different isotropic materials.

The at least nine different isotropic composite materials includes at least three sets of isotropic composite materials. For each set, the first reinforcing material has a particular median particle size, and each set includes at least three different isotropic composite materials, each having a particular volume fraction of the first reinforcing material having the particular median particle size, wherein the particular volume fraction is different for each of the at least three different isotropic composite materials in the set, such that each set of isotropic composite materials includes at least three different volume fractions of the first reinforcing material having the particular median particle size. The particular median particle size is different for each of the at least three sets of isotropic composite materials, such that the at least nine different isotropic composite materials includes at least three different median particle sizes.

For example, the at least nine different isotropic composite materials can include a first set of isotropic composite materials, a second set of isotropic composite materials, and a third set of isotropic composite materials. In some examples, the first reinforcing material can have: a first median particle size in first set of isotropic composite materials, a second median particle size in the second set of isotropic composite materials, and a third median particle size in the third set of isotropic composite materials, wherein the first median particle size, the second median particle size, and the third median particle size are all different. In some examples, the first set of isotropic composite materials includes at least three different volume fractions of the first reinforcing material having the first median particle size, such that the first set of isotropic composite materials includes at least three different isotropic composite materials. In some examples, the second set of isotropic composite materials includes at least three different volume fractions of the first reinforcing material having the second median particle size, such that the second set of isotropic composite materials includes at least three different isotropic composite materials. In some examples, the third set of isotropic composite materials includes at least three different volume fractions of the first reinforcing material having the third median particle size, such that the third set of isotropic composite materials includes at least three different isotropic composite materials.

For example, the at least nine different isotropic composite materials can comprise nine different isotropic composite materials: a first isotropic composite material, a second isotropic composite material, a third isotropic composite material, a fourth isotropic composite material, a fifth isotropic composite material, a sixth isotropic composite material, a seventh isotropic composite material, an eighth isotropic composite material, and a ninth isotropic composite material.

The first isotropic composite material can, for example, include the first reinforcing material having a first median particle size at a first volume fraction. In some examples, the second isotropic composite material includes the first reinforcing material having the first median particle size at a second volume fraction, the second volume fraction being different than the first volume fraction. In some examples, the third isotropic composite material includes the first reinforcing material having the first median particle size at a third volume fraction, the third volume fraction being different than the first volume fraction and the second volume fraction.

The fourth isotropic composite material can, for example, include the first reinforcing material having a second median particle size at a fourth volume fraction, wherein the second median particle size is different than the first median particle size. In some examples, the fifth isotropic composite material includes the first reinforcing material having the second median particle size at a fifth volume fraction, the fifth volume fraction being different than the fourth volume fraction. In some examples, the sixth isotropic composite material includes the first reinforcing material having the second median particle size at a sixth volume fraction, the sixth volume fraction being different than the fourth volume fraction and the fifth volume fraction. In some examples the first volume fraction and the fourth volume fraction are the same. In some examples the second volume fraction and the fifth volume fraction are the same. In some examples, the third volume fraction and the sixth volume fraction are the same.

The seventh isotropic composite material can, for example, include the first reinforcing material having a third median particle size at a seventh volume fraction, wherein the third median particle size is different than the first median particle size and the second median particle size. In some examples, the eighth isotropic composite material includes the first reinforcing material having the third median particle size at an eighth volume fraction, the eighth volume fraction being different than the seventh volume fraction. In some examples, the ninth isotropic composite material includes the first reinforcing material having the third median particle size at a ninth volume fraction, the ninth volume fraction being different than the seventh volume fraction and the eighth volume fraction. In some examples, the first volume fraction and the seventh volume fraction are the same. In some examples, the second volume fraction and the eighth volume fraction are the same. In some examples, the third volume fraction and the ninth volume fraction are the same. In some examples, the first volume fraction, the fourth volume fraction, and the seventh volume fraction are the same. In some examples, the second volume fraction, the fifth volume fraction, and the eighth volume fraction are the same. In some examples, the third volume fraction, the sixth volume fraction, and the ninth volume fraction are the same.

In some examples, the methods can further comprise making the at least nine different isotropic composite materials.

In some examples, the methods can further comprise determining the volume fraction of the first reinforcing material in each of the at least nine isotropic composite materials. For example, the volume fraction of the first reinforcing material can be determined using Equation (C):

$$V_{freinforc} = \frac{\rho_{brittle} w_{reinforc}}{\rho_{brittle} w_{reinforc} + \rho_{reinforc}} \tag{C}$$

wherein $V_{freinforc}$ is the volume fraction of the first reinforcing material in the isotropic composite (matrix) material;

$\rho_{brittle}$ is the mass density of the brittle matrix material;

$w_{reinforc}$ is the weight fraction of the first reinforcing material in the isotropic composite material; and $\rho_{reinforc}$ is the mass density of the first reinforcing material.

In some examples, the methods can further comprise determining the mass density of the brittle matrix material, the weight fraction of the first reinforcing material in the isotropic composite material, the mass density of the first reinforcing material, or a combination thereof.

In some examples, the methods can further comprise determining the number density of the first reinforcing material in each of the at least nine isotropic composite materials. For example, the number density of the first reinforcing material can be determined using equation (D):

$$n = \frac{V_{freinforc}}{V_p} = \frac{V_{freinforc}}{tl^2} \tag{D}$$

wherein $V_{freinforc}$ is the volume fraction of the first reinforcing material in the isotropic composite material;

$V_p$ is median volume of the plurality of particles comprising the first reinforcing material;

t is the median thickness of the plurality of particles comprising the first reinforcing material; and l is the median particle size of the plurality of particles comprising the first reinforcing material.

In some examples, the methods can further comprise determining the median particle size of the plurality of particles comprising the first reinforcing material, the median thickness of the plurality of particles comprising the first reinforcing material, the median volume of the plurality of particles comprising the first reinforcing material, or a combination thereof.

The methods further comprise using the measured mode I fracture toughness of the brittle matrix material and the measured mode I facture toughness of at least nine isotropic composite material samples in Equation (A) below to determine power-law parameters β and q, for example using a standard curve fitting technique:

$$\left(K_{IC\ brittle}^2 \middle/ K_{IC\ composite}^2\right) = (1 - \beta n^q) \tag{A}$$

wherein $K_{IC\ brittle}$ is measured value of the mode I toughness for the brittle matrix material;

$K_{IC\ composite}$ is the measured value of the mode I toughness for the isotropic composite materials; and n is the number density of the first reinforcing material in the isotropic composite materials.

For designing the proposed isotropic composite material, the methods further comprise using the determined power-law parameters β and q and the measured value of the mode I toughness of the brittle matrix material in equation (B) below to determine the volume fraction, the median particle size, and the median particle thickness of the first reinforcing material that achieves the particular mode I fracture toughness for the proposed isotropic composite material:

$$K_{IC\ composite} = K_{IC\ brittle}(1 - V_{freinforc})\left(\frac{1}{\sqrt{1 - \beta\left(\frac{V_{freinforc}}{l^2 t}\right)^q}}\right) \tag{B}$$

wherein $K_{IC\ brittle}$ is measured value of the mode I toughness for the brittle matrix material;

$V_{freinforc}$ is the volume fraction of the first reinforcing material;

l is the median particle size of the first reinforcing material;

t is the median particle thickness of the first reinforcing material; and $K_{IC\ composite}$ is the particular mode I fracture toughness for the proposed isotropic composite material.

In some examples, the particular mode I fracture toughness is the maximum mode I fracture toughness for the proposed isotropic composite material (e.g., the methods comprise using equation (B) to determine the volume fraction, the median particle size, and the median particle thickness of the first reinforcing material that maximizes the mode I fracture toughness for the proposed isotropic composite material).

The proposed orthotropic composite material comprises the first reinforcing material and a second reinforcing material dispersed throughout the brittle matrix material. The second reinforcing material comprises a plurality of fibers that have an elastic modulus, a shear modulus, and a Poisson's ratio. The proposed orthotropic composite material comprises the second reinforcing material and the brittle matric material each at a particular volume fraction.

For designing the proposed orthotropic composite material, the methods further comprise using the determined power-law parameters β and q and the measured value of the mode I toughness of the brittle matrix material in the equations below to determine the particular volume fraction, the median particle size, and the median particle thickness of the first reinforcing material that achieves the particular mode I delamination toughness for the proposed orthotropic composite material:

$$G_{IC\ composite} = K_{IC\ brittle}(1 - V_{fiber})^2\left(\frac{1}{2E_1E_2}\right)^{1/2}\left[\left(\frac{E_1}{E_2}\right)^{1/2} + \left(\frac{E_1 - 2\gamma_{12}G_{12}}{2G_{12}}\right)\right]^{1/2}$$

$$E_1 = E_f V_f + E_m V_m$$

$$E_2 = \frac{E_f E_m}{E_f V_m + E_m V_{fiber}}$$

$$\gamma_{12} = \gamma_f V_{fiber} + \gamma_m V_m$$

$$G_{12} = \frac{G_f G_m}{G_f V_m + G_m V_{fiber}}$$

$$E_m = E_{brittle}\left(1 - \beta\left(\frac{V_{f\ reinforc}}{l^2 t}\right)^q\right)$$

wherein $G_{IC\ composite}$ is the particular mode I delamination toughness for the proposed orthotropic composite material;

$K_{IC\ brittle}$ is measured value of the mode I toughness for the brittle matrix material;

$V_{fiber}$ is the particular volume fraction of the second reinforcing material in the proposed orthotropic composite material;

$E_f$ is the elastic modulus of the second reinforcing material;

$V_m$ is the particular volume fraction of the brittle matrix material in the proposed orthotropic composite material;

$\gamma_f$ is Poisson's ratio of the second reinforcing material;

$\gamma_m$ is Poisson's ratio of the brittle matrix material;

$G_f$ is the shear modulus of the second reinforcing material;

$G_m$ is the shear modulus of the brittle matrix material;

$E_{brittle}$ is the elastic modulus of the brittle matrix material;

$V_{freinforc}$ is the volume fraction of the first reinforcing material;

l is the median particle size of the first reinforcing material; and t is the median particle thickness of the first reinforcing material.

In some examples, the particular mode I delamination toughness is the maximum mode I delamination toughness for the proposed orthotropic composite material (e.g., the methods comprise using the equations above to determine the volume fraction, the median particle size, and the median particle thickness of the first reinforcing material that maximizes the mode I delamination toughness for the proposed orthotropic composite material).

In some examples, the methods can further comprise determining the elastic modulus of the second reinforcing material, Poisson's ratio of the second reinforcing material, Poisson's ratio of the brittle matrix material, the shear modulus of the second reinforcing material, the shear modulus of the brittle matrix material, or a combination thereof.

The brittle matrix material can comprise any suitable material, such as a polymer or glass-like material. In some examples, the brittle matrix material can comprise a polymer. Examples of polymers include, but are not limited to, epoxide (epoxy) polymers (e.g., diglycidyl ether bisphenol A (DGEBA), diglycidyl ether bisphenol F (DGEBF)), vinylester polymers (e.g., polyvinyl chloride), bismaleimides (DMI), copolymers thereof, and blends thereof.

In some examples, the brittle matric material can comprise a thermoset polymer, elastomers, derivatives thereof, and combinations thereof. Suitable thermoset polymers include, but are not limited to, those derived from unsaturated polyester resins, epoxy resins, bismaleimides, and combinations thereof. In some examples, the polymer can comprise an epoxy.

In some examples, the first reinforcing material is dispersed substantially uniformly throughout the brittle matrix material. In some examples, the second reinforcing material, when present, is dispersed substantially uniformly throughout the brittle matrix material. In some examples, the first reinforcing material and the second reinforcing material are both dispersed substantially uniformly throughout the brittle matrix material.

The plurality of particles of the first reinforcing material and/or the plurality of fibers of the second reinforcing material independently comprise a metal oxide, a metal carbide, a carbonaceous or graphitic material, silica based materials, or a combination thereof. In some examples, the plurality of particles of the first reinforcing material and/or the plurality of fibers of the second reinforcing material independently comprise a carbonaceous or graphitic material. Examples of carbon materials include, but are not limited to, graphitic carbon and graphites, including pyrolytic graphite (e.g., highly ordered pyrolytic graphite (HOPG)) and isotropic graphite, amorphous carbon, carbon black, single- or multi-walled carbon nanotubes, graphene (e.g., graphene platelets), glassy carbon, diamond-like carbon (DLC) or doped DLC, such as boron-doped diamond, pyrolyzed photoresist films, and others known in the art. In some examples, the plurality of particles of the first reinforcing material comprise graphene. In some examples, the plurality of fibers of the second reinforcing material comprise glass and/or carbon fibers.

The plurality of particles of the first reinforcing material can comprise particles of any two dimensional (flat) shape (e.g., a quadrilateral, an ellipse, a triangle, a polygon, etc.). In some examples, the plurality of particles of the first reinforcing material can have a regular shape, an irregular shape, an isotropic shape, an anisotropic shape, or a combination thereof.

In some examples, the plurality of particles of the first reinforcing material have a flat, plate like 2D structure. For example, the plurality of particles of the first reinforcing material can have a thickness, length, and width dimensions, wherein the thickness dimension is substantially less than one or both of the other dimensions.

The plurality of particles of the first reinforcing material can have a median particle size and a median thickness. The term "particle size" as used herein refers to the largest straight line distance between two points in a plane substantially perpendicular to the thickness. For example, for a cylindrical or disk like particle, the median particle size can refer to the median diameter. Median particle size and median particle thickness can be measured using methods known in the art, such as evaluation by electron microscopy (e.g., scanning and/or transmission electron microscopy), atomic force microscopy, dynamic light scattering, laser light diffraction measurement, or a combination thereof.

In some examples, the plurality of particles of the first reinforcing material have a median particle size of 50 nanometers (nm) or more (e.g., 75 nm or more, 100 nm or more, 125 nm or more, 150 nm or more, 175 nm or more, 200 nm or more, 225 nm or more, 250 nm or more, 300 nm or more, 350 nm or more, 400 nm or more, 450 nm or more, 500 nm or more, 600 nm or more, 700 nm or more, 800 nm or more, 900 nm or more, 1 micrometer (μm, microns) or more, 1.25 μm or more, 1.5 μm or more, 1.75 μm or more, 2 μm or more, 2.25 μm or more, 2.5 μm or more, 3 μm or more, 3.5 μm or more, 4 μm or more, 4.5 μm or more, 5 μm or more, 6 μm or more, 7 μm or more, 8 μm or more, 9 μm or more, 10 μm or more, 11 μm or more, 12 μm or more, 13 μm or more, 14 μm or more, 15 μm or more, 20 μm or more, 25 μm or more, 30 μm or more, 35 μm or more, or 40 μm or more). In some examples, the plurality of particles of the first reinforcing material have a median particle size of 50 micrometers (μm, microns) or less (e.g., 45 μm or less, 40 μm or less, 35 μm or less, 30 μm or less, 25 μm or less, 20 μm or less, 15 μm or less, 14 μm or less, 13 μm or less, 12 μm or less, 11 μm or less, 10 μm or less, 9 μm or less, 8 μm or less, 7 μm or less, 6 μm or less, 5 μm or less, 4.5 μm or less, 4 μm or less, 3.5 μm or less, 3 μm or less, 2.5 μm or less, 2.25 μm or less, 2 μm or less, 1.75 μm or less, 1.5 μm or less, 1.25 μm or less, 1 μm or less, 900 nanometers (nm) or less, 800 nm or less, 700 nm or less, 600 nm or less, 500 nm or less, 450 nm or less, 400 nm or less, 350 nm or less, 300 nm or less, 250 nm or less, 225 nm or less, 200 nm or less, 175 nm or less, 150 nm or less, 125 nm or less, or 100 nm or less). The median particle size of the plurality of particles of the first reinforcing material can range from any of the minimum values described above to any of the maximum values described above. For example, the plurality of particles of the first reinforcing material can have a median particle size of from 50 nanometers (nm) to 50 micrometers (μm, microns) (e.g., from 50 nm to 1 μm, from 1 μm to 50 μm, from 50 nm to 500 nm, from 500 nm to 5 μm, from 5 μm to 50 μm, from 100 nm to 50 μm, from 50 nm to 25 μm, from 100 nm to 25 μm, from 100 nanometers to 15 μm, from 100 nm to 2 μm, or from 2 μm to 15 μm).

In some examples, the plurality of particles of the first reinforcing material have a median thickness of 5 nanometers (nm) or more (e.g., 6 nm or more, 7 nm or more, 8 nm or more, 9 nm or more, 10 nm or more, 11 nm or more, 12 nm or more, 13 nm or more, 14 nm or more, 15 nm or more, 16 nm or more, 17 nm or more, 18 nm or more, 19 nm or more, 20 nm or more, 21 nm or more, 22 nm or more, 23 nm or more, or 24 nm or more). In some examples, the plurality of particles of the first reinforcing material have a median thickness of 25 nm or less (e.g., 24 nm or less, 23 nm or less, 22 nm or less, 21 nm or less, 20 nm or less, 19 nm or less, 18 nm or less, 17 nm or less, 16 nm or less, 15 nm or less, 14 nm or less, 13 nm or less, 12 nm or less, 11 nm or less, 10 nm or less, 9 nm or less, 8 nm or less, 7 nm or less, or 6 nm or less). The median thickness of the plurality of particles of the first reinforcing material can range from any of the minimum values described above to any of the maximum values described above. For example, the plurality of particles of the first reinforcing material can have a median thickness of from 5 nm to 25 nm (e.g., from 5 nm to 15 nm, from 15 nm to 25 nm, from 5 nm to 10 nm, from 10 nm to 15 nm, from 15 nm to 20 nm, from 20 nm to 25 nm, from 7 nm to 25 nm, from 5 nm to 20 nm, from 7 nm to 20 nm, or from 7 nm to 14 nm).

The volume fraction of the first reinforcing material in any of the plurality of isotropic composite materials, any of the at least nine isotropic composite materials, the proposed isotropic composite material, or a combination thereof can be greater than 0 (e.g., 0.0001 or more, 0.0005 or more, 0.001 or more, 0.0015 or more, 0.002 or more, 0.0025 or more, 0.003 or more, 0.0035 or more, 0.004 or more, 0.0045 or more, 0.005 or more, 0.0055 or more, 0.006 or more, 0.0065 or more, 0.007 or more, 0.0075 or more, 0.008 or more, 0.0085 or more, or 0.009 or more). In some examples, the volume fraction of the first reinforcing material in any of the plurality of isotropic composite materials, any of the at least nine isotropic composite materials, the proposed isotropic composite material, or a combination thereof can be 0.01 or less (e.g., 0.0095 or less, 0.009 or less, 0.0085 or less, 0.008 or less, 0.0075 or less, 0.007 or less, 0.0065 or less, 0.006 or less, 0.0055 or less, 0.005 or less, 0.0045 or less, 0.004 or less, 0.0035 or less, 0.003 or less, 0.0025 or less, 0.002 or less, 0.0015 or less, or 0.001 or less). The volume fraction of the first reinforcing material in any of the plurality of isotropic composite materials, any of the at least nine isotropic composite materials, the proposed isotropic composite material, or a combination thereof can range from any of the minimum values described above to any of the maximum values described above. For example, the volume fraction of the first reinforcing material in any of the plurality of isotropic composite materials, any of the at least nine isotropic composite materials, the proposed isotropic composite material, or a combination thereof can be from greater than 0 to 0.01 (e.g., from greater than 0 to 0.005, from 0.005 to 0.01, from greater than 0 to 0.002, from 0.002 to 0.004, from 0.004 to 0.006, from 0.006 to 0.008, from 0.008 to 0.01, from greater than 0 to 0.009, from 0.0001 to 0.01, from 0.0001 to 0.009, or from 0.001 to 0.006).

For example, the first reinforcing material can be present in any of the plurality of isotropic composite materials, any of the at least nine isotropic composite materials, the proposed isotropic composite material, or a combination thereof in an amount of greater than 0% by volume (e.g., 0.01% by volume or more, 0.05% by volume or more, 0.1% by volume or more, 0.15% by volume or more, 0.2% by volume or more, 0.25% by volume or more, 0.3% by volume or more, 0.35% by volume or more, 0.4% by volume or more, 0.45% by volume or more, 0.5% by volume or more, 0.55% by volume or more, 0.6% by volume or more, 0.65% by volume or more, 0.7% by volume or more, 0.75% by volume or more, 0.8% by volume or more, 0.85% by volume or more, or 0.9% by volume or more). In some examples, the first reinforcing material can be present in any of the plurality of isotropic composite materials, any of the at least nine isotropic composite materials, the proposed isotropic composite material, or a combination thereof in an amount of 1% or less by volume (e.g., 0.95% by volume or less, 0.9% by volume or less, 0.85% by volume or less, 0.8% by volume or less, 0.75% by volume or less, 0.7% by volume or less, 0.65% by volume or less, 0.6% by volume or less, 0.55% by volume or less, 0.5% by volume or less, 0.45% by volume or less, 0.4% by volume or less, 0.35% by volume or less, 0.3% by volume or less, 0.25% by volume or less, 0.2% by volume or less, 0.15% by volume or less, or 0.10% by volume or less). The amount of the first reinforcing material present in any of the plurality of isotropic composite materials, any of the at least nine isotropic composite materials, the proposed isotropic composite material, or a combination thereof can range from any of the minimum values described above to any of the maximum values described above. For example, the first reinforcing material can be present in any of the plurality of isotropic composite materials, any of the at least nine isotropic composite materials, the proposed isotropic composite material, or a combination thereof in an amount of from greater than 0% to 1% by volume (e.g., from greater than 0% to 0.5% by volume, from 0.5% to 1% by volume, from greater than 0% to 0.2% by volume, from 0.2% to 0.4% by volume, from 0.4% to 0.6% by volume, from 0.6% to 0.8% by volume, from 0.8% to 1% by volume, from greater than 0% to 0.9% by volume, from 0.010% to 1T % by volume, from 0.010% to 0.9% by volume, or from 0.1% to 0.6% by volume).

The number density of the first reinforcing material in any of the plurality of isotropic composite materials, any of the at least nine isotropic composite materials, the proposed isotropic composite material, or a combination thereof can be greater than 0 particles/mm$^3$ or more (e.g., 0.01 particles/mm$^3$ or more, 0.05 particles/mm$^3$ or more, 0.1 particles/mm$^3$ or more, 0.5 particles/mm$^3$ or more, 1 particles/mm$^3$ or more, 5 particles/mm$^3$ or more, 10 particles/mm$^3$ or more, 50 particles/mm$^3$ or more, $1\times10^2$ particles/mm$^3$ or more, $5\times10^2$ particles/mm$^3$ or more, $1\times10^3$ particles/mm$^3$ or more, $5\times10^3$ particles/mm$^3$ or more, $1\times10^4$ particles/mm$^3$ or more, $5\times10^4$ particles/mm$^3$ or more, $1\times10^5$ particles/mm$^3$ or more, $5\times10^5$ particles/mm$^3$ or more, $1\times10^6$ particles/mm$^3$ or more, $5\times10^6$ particles/mm$^3$ or more, $1\times10^7$ particles/mm$^3$ or more, $5\times10^7$ particles/mm$^3$ or more, $1\times10^8$ particles/mm$^3$ or more, or $5\times10^8$ particles/mm$^3$ or more). In some examples, the number density of the first reinforcing material in any of the plurality of isotropic composite materials, any of the at least nine isotropic composite materials, the proposed isotropic composite material, or a combination thereof can be $1\times10^9$ particles/mm$^3$ or less (e.g., $5\times10^8$ particles/mm$^3$ or less, $1\times10^8$ particles/mm$^3$ or less, $5\times10^7$ particles/mm$^3$ or less, $1\times10^7$ particles/mm$^3$ or less, $5\times10^6$ particles/mm$^3$ or less, $1\times10^6$ particles/mm$^3$ or less, $5\times10^5$ particles/mm$^3$ or less, $1\times10^5$ particles/mm$^3$ or less, $5\times10^4$ particles/mm$^3$ or less, $1\times10^4$ particles/mm$^3$ or less, $5\times10^3$ particles/mm$^3$ or less, $1\times10^3$ particles/mm$^3$ or less, $5\times10^2$ particles/mm$^3$ or less, $1\times10^2$ particles/mm$^3$ or less, 50 particles/mm$^3$ or less, 10 particles/mm$^3$ or less, 5 particles/mm$^3$ or less, 1 particles/mm$^3$ or less, 0.5 particles/mm$^3$ or less, or 0.1 particles/mm$^3$ or less). The number density of the first reinforcing material in any of the plurality of isotropic composite materials, any of the at least nine isotropic composite materials, the proposed isotropic composite material, or a combination thereof can range from any of the minimum values described above to any of the maximum values described above. For example, number density of the first reinforcing material in any of the plurality of isotropic composite materials, any of the at least nine isotropic composite materials, the proposed isotropic composite material, or a combination thereof can be from greater than 0 to $1\times10^9$ particles/mm$^3$ (e.g., from greater than 0 particles/mm$^3$ to $5\times10^4$ particles/mm$^3$, from $5\times10^4$ particles/mm$^3$ to $1\times10^9$ particles/mm$^3$, from greater than 0 particles/mm$^3$ to $1\times10^3$ particles/mm$^3$, from $1\times10^3$ particles/mm$^3$ to $1\times10^6$ particles/mm$^3$, from $1\times10^6$ particles/mm$^3$ to $1\times10^9$ particles/mm$^3$, from 0.01 particles/mm$^3$ to $1\times10^9$ particles/mm$^3$, from greater than 0 particles/mm$^3$ to $5\times10^8$ particles/mm$^3$, or from 0.01 particles/mm$^3$ to $5\times10^8$ particles/mm$^3$).

The plurality of fibers of the second reinforcing material can have a median diameter and a median length. The median diameter and median length can be measured using methods known in the art, such as evaluation by electron microscopy (e.g., scanning and/or transmission electron microscopy), atomic force microscopy, dynamic light scattering, or a combination thereof.

In some examples, the plurality of fibers of the second reinforcing material can have a median diameter of 1 micrometers (μm, microns) or more (e.g., 1.5 μm or more, 2 μm or more, 2.5 μm or more, 3 μm or more, 3.5 μm or more, 4 μm or more, 4.5 μm or more, 5 μm or more, 6 μm or more, 7 μm or more, 8 μm or more, or 9 μm or more). In some examples, the plurality of fibers of the second reinforcing material can have a median diameter of 10 μm or less (e.g., 9 μm or less, 8 μm or less, 7 μm or less, 6 μm or less, 5 μm or less, 4.5 μm or less, 4 μm or less, 3.5 μm or less, 3 μm or less, 2.5 μm or less, or 2 μm or less). The median diameter of the plurality of fibers of the second reinforcing material can range from any of the minimum values described above to any of the maximum values described above. For example, the plurality of fibers of the second reinforcing material can have a median diameter of from 1 μm to 10 μm (e.g., from 1 μm to 5 μm, from 5 μm to 10 μm, from 1 μm to 2.5 μm, from 2.5 μm to 5 μm, from 5 μm to 7.5 μm, from 7.5 μm to 10 μm, from 2 μm to 10 μm, from 1 μm to 9 μm, from 2 μm to 9 μm, or from 4 μm to 6 μm).

In some examples, the plurality of fibers of the second reinforcing material can have a median length of 500 μm or more (e.g., 750 μm or more, 1 millimeter (mm) or more, 2 mm or more, 3 mm or more, 4 mm or more, 5 mm or more, 7.5 mm or more, 1 centimeter (cm) or more, 2 cm or more, 3 cm or more, 4 cm or more, 5 cm or more, 10 cm or more, 15 cm or more, 20 cm or more, 30 cm or more, 40 cm or more, 50 cm or more, 75 cm or more, 1 meter (m) or more, 2 m or more, 3 m or more, 4 m or more, 5 m or more, 6 m or more, 7 m or more, 8 m or more, or 9 m or more). In some examples, the plurality of fibers of the second reinforcing material can have a median length of 10 meters (m) or less (e.g., 9 m or less, 8 m or less, 7 m or less, 6 m or less, 5 m or less, 4 m or less, 3 m or less, 2 m or less, 1 m or less, 75 centimeters (cm) or less, 50 cm or less, 40 cm or less, 30 cm or less, 20 cm or less, 15 cm or less, 10 cm or less, 5 cm or less, 4 cm or less, 3 cm or less, 2 cm or less, 1 cm or less, 7.5 millimeters (mm) or less, 5 mm or less, 4 mm or less, 3 mm or less, 2 mm or less, 1 mm or less, or 750 micrometers or less). The median length of the plurality of fibers of the second reinforcing material can range from any of the minimum values described above to any of the maximum values described above. For example, the plurality of fibers of the second reinforcing material can have a median length of from 500 μm to 10 m (e.g., from 500 micrometers to 5 centimeters, from 5 centimeters to 10 meters, from 500 micrometers to 5 millimeters, from 5 millimeters to 5 centimeters, from 5 centimeters to 50 centimeters, from 50 centimeters to 10 meters, from 1 millimeter to 10 meters, from 500 micrometers to 5 meters, from 1 millimeter to 10 meters, or from 1 meter to 10 meters).

The volume fraction of the second reinforcing material in the proposed orthotropic composite material, in any of the plurality of orthotropic composite materials, or a combination thereof can be greater than 0 (e.g., 0.1 or more, 0.2 or more, 0.3 or more, 0.4 or more, 0.5 or more, 0.6 or more, or 0.7 or more). In some examples, volume fraction of the second reinforcing material in the proposed orthotropic composite material, in any of the plurality of orthotropic composite materials, or a combination thereof can be 0.8 or less (e.g., 0.7 or less, 0.6 or less, 0.5 or less, 0.4 or less, 0.3 or less, or 0.2 or less). The volume fraction of the second reinforcing material in the proposed orthotropic composite material, in any of the plurality of orthotropic composite materials, or a combination thereof can range from any of the minimum values described above to any of the maximum values described above. For example, the volume fraction of the second reinforcing material in the proposed orthotropic composite material, in any of the plurality of orthotropic composite materials, or a combination thereof can be from greater than 0 to 0.8 (e.g., from greater than 0 to 0.4, from 0.4 to 0.8 from greater than 0 to 0.2, from 0.2 to 0.4, from 0.4 to 0.6, from 0.6 to 0.8, from 0.1 to 0.8, from greater than 0 to 0.7, from 0.1 to 0.7, or from 0.4 to 0.6).

Any of the methods disclosed herein can be carried out in whole or in part on one or more computing or processing devices.

Figure 10:
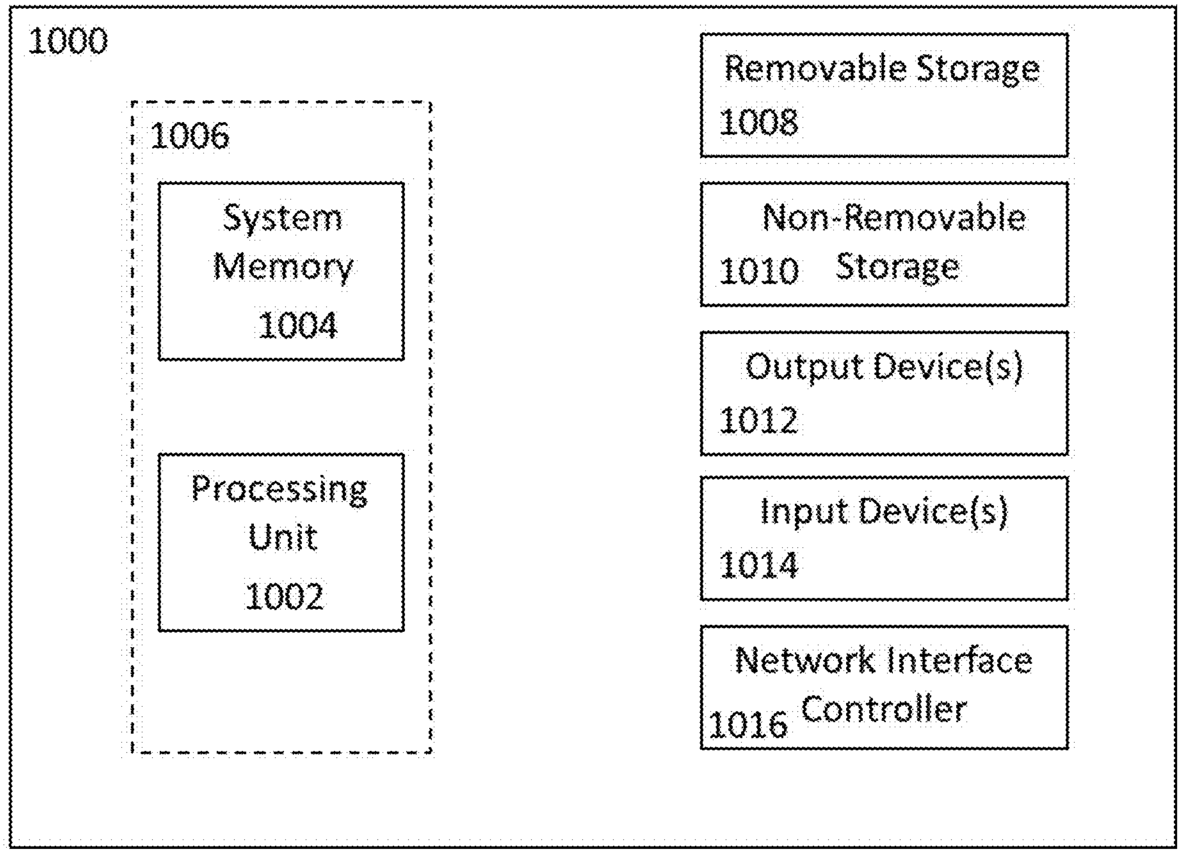
FIG. 10. Schematic illustration of an example computing device.

FIG. 10 illustrates an example computing device 1000 upon which examples disclosed herein may be implemented. The computing device 1000 can include a bus or other communication mechanism for communicating information among various components of the computing device 1000. In its most basic configuration, computing device 1000 typically includes at least one processing unit 1002 (a processor) and system memory 1004. Depending on the exact configuration and type of computing device, system memory 1004 may be volatile (such as random access memory (RAM)), non-volatile (such as read-only memory (ROM), flash memory, etc.), or some combination of the two. This most basic configuration is illustrated in FIG. 10 by a dashed line 1006. The processing unit 1002 may be a standard programmable processor that performs arithmetic and logic operations necessary for operation of the computing device 1000.

The computing device 1000 can have additional features/functionality. For example, computing device 1000 may include additional storage such as removable storage 1008 and non-removable storage 1010 including, but not limited to, magnetic or optical disks or tapes. The computing device 1000 can also contain network connection(s) 1016 that allow the device to communicate with other devices. The computing device 1000 can also have input device(s) 1014 such as a keyboard, mouse, touch screen, antenna or other systems configured to communicate with the camera in the system described above, etc. Output device(s) 1012 such as a display, speakers, printer, etc. may also be included. The additional devices can be connected to the bus in order to facilitate communication of data among the components of the computing device 1000.

The processing unit 1002 can be configured to execute program code encoded in tangible, computer-readable media. Computer-readable media refers to any media that is capable of providing data that causes the computing device 1000 (i.e., a machine) to operate in a particular fashion. Various computer-readable media can be utilized to provide instructions to the processing unit 1002 for execution. Common forms of computer-readable media include, for example, magnetic media, optical media, physical media, memory chips or cartridges, a carrier wave, or any other medium from which a computer can read. Example computer-readable media can include, but is not limited to, volatile media, non-volatile media, and transmission media. Volatile and non-volatile media can be implemented in any method or technology for storage of information such as computer readable instructions, data structures, program modules or other data and common forms are discussed in detail below. Transmission media can include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 1002 can execute program code stored in the system memory 1004. For example, the bus can carry data to the system memory 1004, from which the processing unit 1002 receives and executes instructions. The data received by the system memory 1004 can optionally be stored on the removable storage 1008 or the non-removable storage 1010 before or after execution by the processing unit 1002.

The computing device 1000 typically includes a variety of computer-readable media. Computer-readable media can be any available media that can be accessed by device 1000 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 1004, removable storage 1008, and non-removable storage 1010 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media can be part of computing device 1000.

It should be understood that the various techniques described herein can be implemented in connection with hardware or software or, where appropriate, with a combination thereof. Thus, the methods, systems, and associated signal processing of the presently disclosed subject matter, or certain aspects or portions thereof, can take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs can implement or utilize the processes described in connection with the presently disclosed subject matter, e.g., through the use of an application programming interface (API), reusable controls, or the like. Such programs can be implemented in a high level procedural or object-oriented programming language to communicate with a computer system. However, the program(s) can be implemented in assembly or machine language, if desired. In any case, the language can be a compiled or interpreted language and it may be combined with hardware implementations.

In certain examples, the methods can be carried out in whole or in part on a computing device 1000 comprising a processor 1002 and a memory 1004 operably coupled to the processor 1002, the memory 1004 having further computer-executable instructions stored thereon that, when executed by the processor 1002, cause the processor 1002 to carry out one or more of the method steps described above.

Also disclosed herein are the proposed isotropic composite material and/or the proposed orthotropic composite materials designed by any of the methods disclosed herein. Also disclosed herein are objects and/or articles of manufacture comprising any of the proposed isotropic composite materials and/or the proposed orthotropic composite materials described herein. Also disclosed herein are methods of use of any of the proposed isotropic composite materials and/or the proposed orthotropic composite materials, objects, and/or articles of manufacture described herein.

For example, also disclosed herein are objects and/or articles of manufacture comprising any of the proposed isotropic composite material and/or the proposed orthotropic composite materials designed by any of the methods disclosed herein. The object and/or article of manufacture can, for example, comprise at least a portion of a vehicle (e.g., an armored vehicle or an unarmored vehicle). Examples of vehicles include, but are not limited to, wagon, bicycles, motor vehicles (e.g., motorcycles, cars, trucks, buses, etc.), railed vehicles (e.g., trains, trams, etc.), watercraft (e.g., ships, boats, etc.), amphibious vehicles (e.g., hovercraft), aircraft (e.g., airplanes, helicopters, etc.), and spacecraft. In some examples, the object and/or article of manufacture can comprise at least a portion of an airframe or a wind turbine rotor blade.

Also disclosed herein are methods of use of any of the proposed isotropic composite material and/or the proposed orthotropic composite materials designed by any of the methods disclosed herein. For example, the methods can comprise using the proposed isotropic composite material and/or the proposed orthotropic composite material in an aerospace, automotive, sporting good, boating, and/or wind energy application. In some examples, the methods can comprise using the proposed isotropic composite material and/or the proposed orthotropic composite material in an aerospace material system. In some examples, the methods can comprise using the proposed isotropic composite material and/or the proposed orthotropic composite material in an aerospace platform, such as an airframe, a space vehicle, or a satellite. In some examples, the methods can comprise using the proposed isotropic composite material and/or the proposed orthotropic composite material in a transportation application, a defense application, or a consumer product.

A number of embodiments of the invention have been described. Nevertheless, it will be understood that various modifications may be made without departing from the spirit and scope of the invention. Accordingly, other embodiments are within the scope of the following claims.

The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1—Nano Shield: Maximizing Toughness Enhancement in Brittle Materials Utilizing Crack-Shielding Effect at the Nanoscale The use of graphene nanoparticles (GNP) can significantly improve stiffness and fracture toughness in brittle matrix materials and their composites. However, in most cases it has been observed that there is an optimum concentration of graphene nanoparticles that maximizes fracture toughness, and this is quickly followed by a degradation in fracture toughness due to particle agglomeration when the optimum concentration of graphene nanoparticles (i.e., weight fraction of the graphene nanoparticles relative to the matrix material) is exceeded. To date, the identification of this optimum graphene nanoparticle weight fraction is performed through lengthy and costly trial-and-error based fracture experiments. To complicate matters further, not only the graphene nanoparticle weight fraction but also the graphene nanoparticle size plays an important role in maximizing the toughness of the matrix material, thereby increasing the size of the test matrix.

For example, U.S. Pat. No. 45,911E1 relates to polymer matrix composites with nanoscale reinforcement. For example, U.S. Pat. No. 45,911E1 describes a composite material comprising a matrix material and a reinforcement material, wherein the reinforcement is present in a concentration between approximately 0.010% and 0.4% on the basis of the weight of the composite material so as to improve at least one of strength and toughness of the composite. However, there is no mention of how to obtain maximum toughness or identify the optimum size and weight fraction of nanoparticles without costly trial-and-error experimentation.

U.S. Pat. No. 8,293,812 describes polymer composite materials comprising a thermoplastic host polymer having solid particulate material dispersed therethrough, wherein the composite exhibits an increase in modulus of no more than 15% and a higher tensile strength, relative to said host polymer. U.S. Pat. No. 8,293,812 does not describe any improvements related to fracture toughness or crack propagation, much less a method for determining the size and/or concentration of nanomaterial used in the composite to optimize the fracture toughness of the composite.

EP2868690 describes thermoplastic polymers combined with carbon nanomaterials, and methods of preparing the same, where said materials exhibit excellent tensile strength, tensile modulus, electromagnetic shielding effects, anti-static effects, and the like. EP2868690 does not discuss with size and/or shape of the carbon nanomaterial nor any improvements related to fracture toughness or crack propagation, much less a method for determining the size and/or concentration of nanomaterial used in the composite to optimize the fracture toughness of the composite.

WO2015184223 describes laminates comprising oligomer-grafted nanofillers in advanced composite materials. WO2015184223 describes that attempts have been made to include filler particles in polymeric composite materials to improve the mechanical properties of said composites, but the mechanical properties of the composites often suffer as a result of incompatibility between the filler particle and the polymeric matrix. WO2015184223 describes the improvement in fracture toughness and the correlation of microcrack propagation of the composite materials at different nanofiller loadings. However, the toughness and strength enhancement in the polymer composites using compatibilized nanofillers in WO2015184223 is carried out using a purely trial-and-error approach. There is no mention of how toughness can be maximized and optimum nanoparticle size and concentration can be obtained without recourse to extensive trial-and error fracture testing.

Disclosed herein is a methodology that can eliminate this expensive trial and error approach, and zeros-in on the maximum toughness increase using only a few experimental data points. To achieve this goal, the method utilizes the scientific principle that nanoscale reinforcements can provide toughness enhancement in an isotropic brittle matrix material through a mechanism that involves shielding of the crack tip during crack initiation. Herein, the methodology derived from this principle uses a small set of test data to directly obtain maximum fracture toughness as a function of median graphene nanoparticle size and weight fraction, thereby eliminating extensive trial-and-error experimentation and saving time and money. The governing principle is that, for a single large-scale crack in a nanoparticle reinforced matrix under an applied tensile loading, the stress intensity at the crack tip will result in stress-induced microcracks at nanoparticle/matrix interfaces and between nanoparticles in the fracture process zone (FPZ) surrounding the crack tip as schematically depicted in FIG. 1. The formation of microcracks in the fracture process zone results in a significantly reduced elastic modulus of the matrix material in the fracture process zone, giving rise to the crack shielding effect that plays a primary role in significantly enhancing initiation fracture toughness. Further, the crack tip shielding effect can be even greater for a nanoparticle reinforced orthotropic material (e.g., carbon fiber reinforced composites), as compared with an isotropic matrix material, because of synergistic interactions between material orthotropy and the crack tip shielding effect. The methodology disclosed herein based on crack-shielding effect of nanoparticles in conjunction with only a few (~10) experiments can obtain the graphene nanoparticle size and its weight fraction necessary to maximize fracture toughness in the material, before particle agglomeration can set in and cause toughness degradation.

The methods disclosed herein can provide a composite material, comprising a matrix material and a reinforcement material (or phase), wherein the composite material has a targeted improvement in fracture toughness through the optimum sizing and concentration of the reinforcing material/phase. The reinforcement material can, for example, have at least one dimension of approximately 100 nm or less and is dispersed substantially uniformly within the matrix material.

The methods disclosed herein are based on sound scientific principles of crack-shielding in fracture mechanics, and can maximize fracture toughness in a brittle matrix material and its composite and predict optimum nanoparticle size and concentration without recourse to extensive and expensive trial-and-error experiments. The methods disclosed herein, being based on the principles of fracture mechanics and not on empirical curve-fitting of data-set, can therefore eliminate the need for time intensive and costly trial-and-error based fracture experiments. This has not been done before and could have a dramatic impact on future aerospace materials certification procedures.

Maximizing stiffness, toughness, and damage tolerance while minimizing weight and cost are key considerations for the development of any new aerospace material system. This is also true, although to a lesser extent, for the automotive and the wind-energy industry. The application of nanofiller reinforced materials can significantly impact the structural design of future aerospace platforms including airframes, space vehicles, satellites, and a multitude of other load-bearing systems. The methods described herein can reduce the cost of materials development by eliminating trial-and-error testing. For example, Toyota Motors has been incorporating nanoparticles in car bumpers for improved impact strength. Boeing has used nanoparticle coatings on helicopter rotor blades for improved erosion resistance. Further, the increased fracture toughness has the potential to increase the flaw tolerance of the material (including manufacturing flaws), facilitating damage tolerant design of structures and provide significant benefit in weight reduction. The implementation of the methods described herein can be used for fracture and fatigue analysis for other advanced aerospace systems. The successful development and implementation of the methods described herein can further reduce the weight of aerospace and automotive structures and therefore can reduce the use of fuel and lower $CO_2$ emissions, thereby contributing to a lower carbon footprint that can help mitigate ecological pressures.

Example 2

The use of graphene nanoparticles (GNP) can significantly improve stiffness and fracture toughness in brittle matrix materials and their composites. However, in most cases it has been observed that there is an optimum concentration of graphene nanoparticles that maximizes fracture toughness, and this is quickly followed by a degradation in fracture toughness due to particle agglomeration when the optimum concentration of graphene nanoparticles (i.e., weight fraction of the graphene nanoparticles relative to the matrix material) is exceeded. To complicate matters further, not only the graphene nanoparticle weight fraction but also the graphene nanoparticle size plays an important role in maximizing the toughness of the matrix material. Currently, the identification of the optimum graphene nanoparticle size and weight fraction for maximizing fracture toughness is performed through lengthy and costly trial-and-error based fracture experiments.

Disclosed herein is a methodology using a computer algorithm that is based on the crack-shielding effect of nanoparticles with input from only a few experiments (~10 tests) to obtain the graphene nanoparticle size and its weight fraction necessary to maximize fracture toughness in the material, before particle agglomeration can set in and cause toughness degradation. The synergistic combination of a small set of fracture test data coupled with an algorithm based on the crack-shielding phenomenon due to particles at the nanoscale to predict the nanoparticle size and weight fraction required to maximize fracture toughness has not been done before.

Detailed Description of Methodology

A. Categories of Fracture Toughness

Fracture toughness enhancement in a polymer nanocomposite is usually subdivided into two main categories: (a) initiation toughness and (b) propagation toughness enhancement. Typically, nanoscale reinforcements can provide initiation toughness enhancement in a polymer composite through a mechanism that involves shielding of the crack tip during crack initiation. This is sometimes referred to as intrinsic toughening mechanism as it occurs in the process zone ahead of the crack tip. After a crack is initiated and it begins to grow, nanofillers can also provide propagation toughness enhancement through extrinsic mechanisms such as plastic dissipation, crack bridging, crack deflection, and particle pull-out during the crack propagation phase.

B. Initiation Toughness Modeling for Isotropic Polymer and Polymer Matrix Composite (PMC) Reinforced with Graphene Nanoparticles Assuming that the weight fraction of graphene nanoparticles ($w_{GNP}$) in an epoxy nanocomposite is specified, then the volume fraction of graphene nanoparticles ($V_{fGNP}$) can be readily calculated as:

$$V_{fGNP} = \frac{\rho_{epoxy} w_{GNP}}{\rho_{epoxy} w_{GNP} + \rho_{GNP}} \tag{1}$$

where, $\rho_{epoxy}$ is the mass density of the epoxy polymer, and $\rho_{GNP}$ is the mass density of the graphene nanoparticles. From Equation (1), the number of graphene nanoparticles in a unit volume of the nanocomposite (i.e., graphene nanoparticle number density) can then be computed to be:

$$n = \frac{V_{fGNP}}{V_P} = \frac{V_{fGNP}}{t l_p^2} \tag{2}$$

where, $V_P$ is the median volume of graphene nanoparticles, and is expressed as the product of the median particle size ($l_p$) squared, times its median thickness, t, $$\left(\text{i.e., } V_P = t l_p^2\right)$$

as shown on the right hand side of Equation (2).

a) Isotropic Polymer Case: The effective toughness increase in a nanocomposite material is the result of two competing effects: (a) crack-tip shielding due to graphene nanoparticle induced microcracking, which enhances toughness, and (b) local toughness degradation in the fracture process zone. Both of these competing effects are incorporated in the methods disclosed herein.

Figure 2:
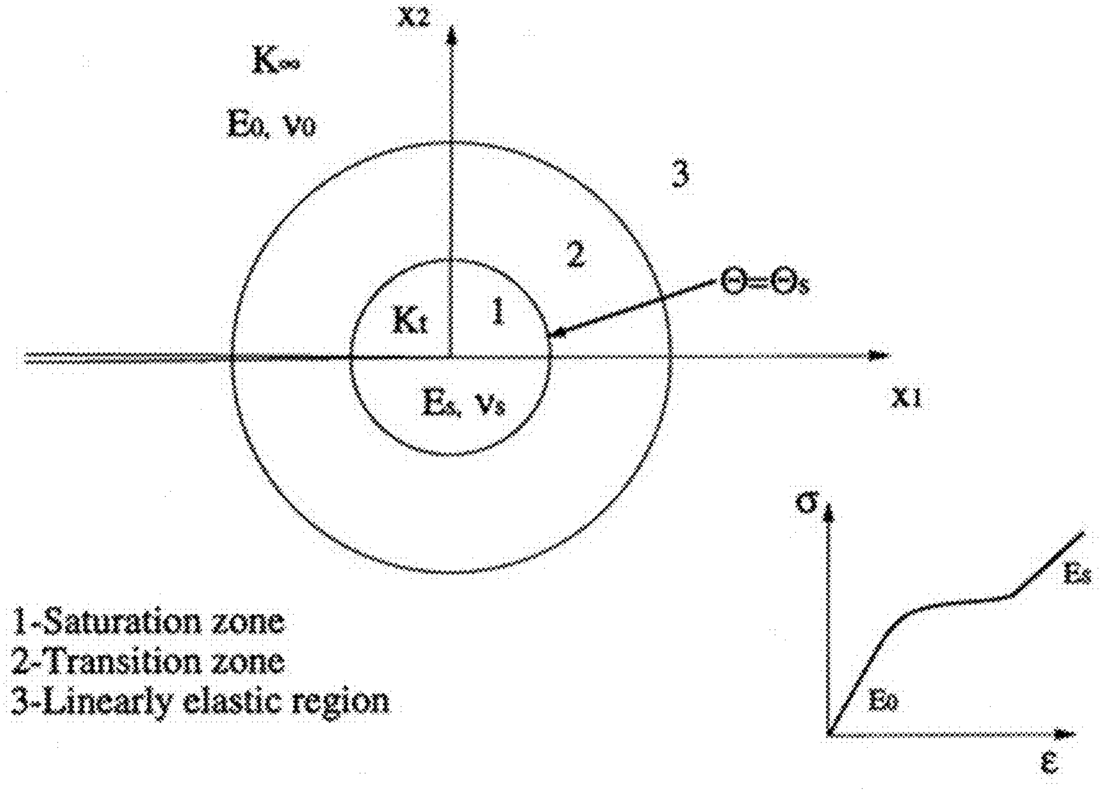
FIG. 2. Schematic of process zone at the crack tip region showing three distinct material damage domains. E is modulus.

FIG. 2 is a schematic diagram of process zone at the crack tip region showing three distinct material damage domains.

From the path-independence of J-integral at crack initiation in a graphene nanoparticle reinforced epoxy polymer, $J_{tip}=J_\infty$ (i.e., near-tip J=far-field J). From linear elastic fracture mechanics (LEFM), under plane stress conditions:

$$J = \frac{K^2}{E} \tag{3}$$

where, K is the stress intensity factor and E is the elastic modulus of the nanocomposite material. Combining path-independence of J (i.e., $J_{tip}=J_\infty$) with Equation (3) gives the relationship between the near-tip and far-field stress intensity factors as quantified in Equation (4):

$$\frac{K_{tip}^2}{E_{tip}} = \frac{K_{N.C.FF.}^2}{E_{N.C.FF}} \Rightarrow \frac{K_{tip}}{K_{N.C.FF.}} = \sqrt{\frac{E_{tip}}{E_{N.C.FF}}} \tag{4}$$

where, $K_{tip}$ is the stress intensity factor at the crack-tip of the nanocomposite, and $K_{N.C.FF.}$ is the far-field stress intensity factor for the nanocomposite, $E_{tip}$ is the isotropic elastic modulus of the nanocomposite in the fracture process zone near the crack tip including micro-damaged material, and $E_{N.C.FF}$ is the isotropic elastic modulus of the undamaged nanocomposite in the far-field away from the fracture process zone. Note that $E_{tip}$ is typically lower than the far-field $E_{N.C.FF}$ due to micro-damage in the fracture process zone caused by the presence of randomly dispersed graphene nanoparticles.

Analysis of fracture test data obtained from prior work, indicates that the degradation in the near-tip nanocomposite modulus ($E_{tip}$) is a function of the microcrack density in the fracture process zone which, in turn, is proportional to the graphene nanoparticles number density (n) due to inter-particle microcracking and/or interfacial debonding as depicted in FIG. 1, and it obeys a power-law relation obtained by fitting prior K ($K_{IC}$) data vs. n for EPON862/GNP yielding:

$$E_{tip} = E_{epoxy}\left(K_{ICM}^2 / K_{ICN.C.FF}^2\right) = E_{epoxy}(1 - \beta n^q) \tag{5}$$

where $E_{epoxy}$=1.68 GPa is the elastic modulus of the undamaged EPON 862 epoxy matrix without graphene nanoparticles, $\beta$=0.73 and q=0.01 are power-law parameters, and n is the number density of graphene nanoparticles given by Equation (2). The values of Mode I toughness ($K_{IC_M}$) of the epoxy matrix and the far-field stress intensity factor for the nanocomposite ($K_{N.C.FF.}$) used in Equation (5) to extract $\beta$=0.73 and q=0.01 are obtained from the 10 fracture tests mentioned earlier.

Substituting Equation (5) and Equation (2) in Equation (4), and solving for $K_{tip}$ gives:

$$K_{tip} = K_{N.C.FF.} \sqrt{1 - \beta\left(\frac{V_{fGNP}}{l_p{}^2 t_p}\right)^q} \tag{6}$$

Equation (6) defines the crack tip shielding effect due to graphene nanoparticles induced micro-cracking leading to material softening near the crack tip.

To model local toughness degradation due to microcracking in the fracture process zone of the isotropic nanocomposite, it is reasonable to assume that the near-tip critical toughness value, $K_{tip}$, is proportional to the epoxy matrix Mode I toughness ($K_{IC_M}$) that has been slightly degraded due to the volume fraction of graphene nanoparticles induced microcracks (i.e. $V_{fGNP}$) that are present in the fracture process zone using a rule-of-mixtures based approach, that is:

$$K_{tip_c} = K_{IC_M}(1 - V_{fGNP}) \tag{7}$$

Substituting Equation (7) in Equation (6), and solving for the far-field toughness of the nanocomposite $K_{IC_{N.C.FF}}$, gives:

$$K_{IC_{N,C,FF}} = K_{IC_M}(1 - V_{fGNP})\frac{1}{\sqrt{1 - \beta\left(\frac{V_{fGNP}}{l_p{}^2 t_p}\right)^q}} \tag{8}$$

where β and q are unknown parameters to be obtained from the ~10 test data points. The value of β can depend on the volume fraction of the nanoparticle, and q is a constant.

From the analytical expression in Equation (8), it is evident that for a given $t_p$, $V_{fGNP}$, and $K_{IC_M}$, reducing particle size ($l_p$) will result in higher values of far-field fracture toughness of the nanocomposite ($K_{IC_{N.C.FF}}$) because it rapidly decreases the denominator in the expression on the right hand side of Equation (8). Similarly, increasing graphene nanoparticle volume fraction ($V_{fGNP}$) will decrease the denominator and enhance toughness.

Figure 3:
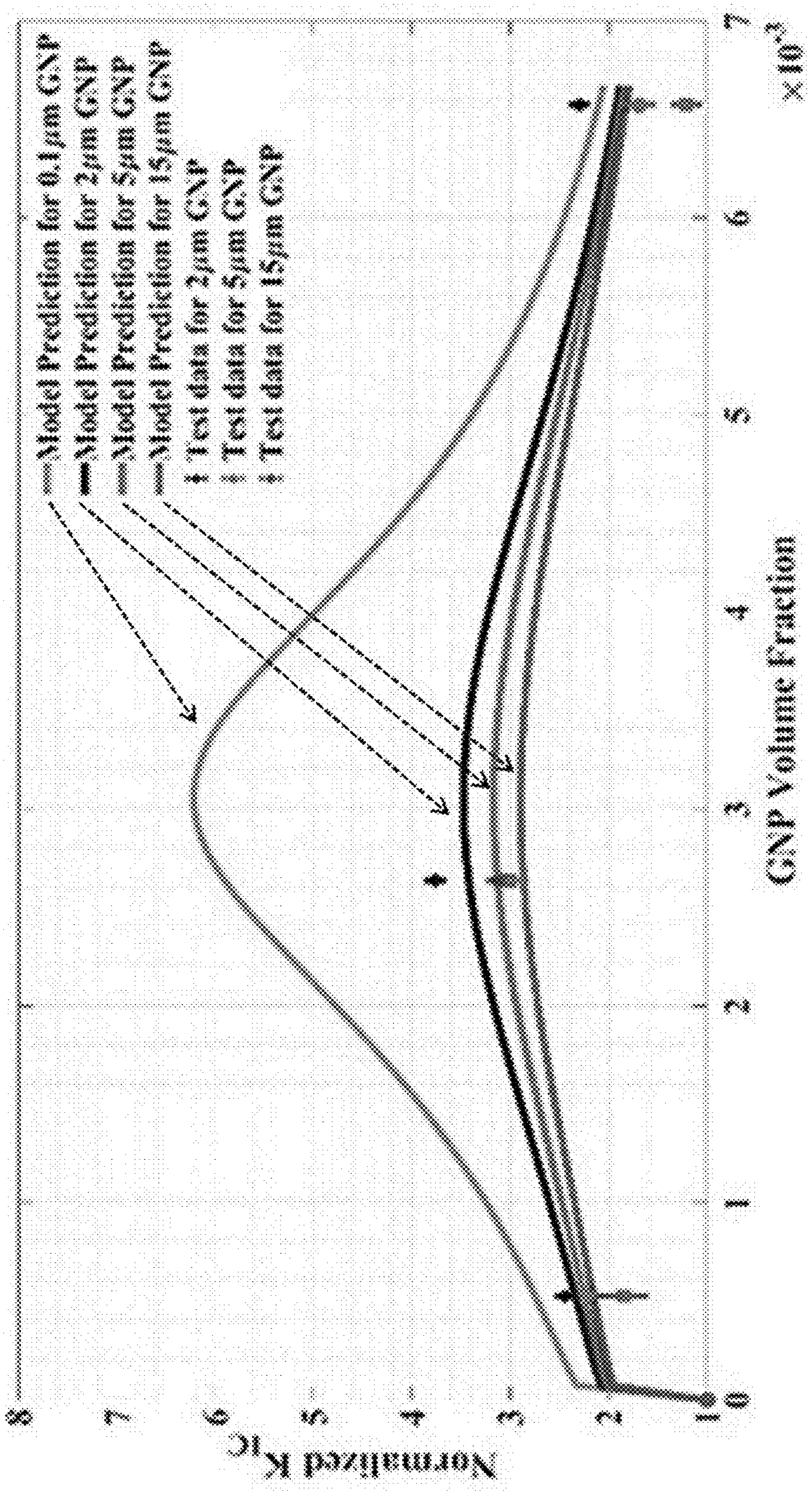
FIG. 3. Predictions of toughness for compact tension (CT) specimens compared with test data.

Model predictions for the normalized Mode I initiation toughness for isotropic graphene nanoparticle/epoxy nanocomposite obtained using Equation (8) in a MATLAB algorithm are shown in FIG. 3 as a function of graphene nanoparticle volume fraction, and are compared with available Compact Tension crack initiation toughness data for $l_p$=2 and 5 μm graphene nanoparticles (see Example 3). Note that the predicted curves rise nonlinearly with increasing $V_{fGNP}$ and decreasing graphene nanoparticle size, indicating good synergy. Comparison with fracture test data for isotropic epoxy matrix with dispersed graphene nanoparticles indicates that the method disclosed herein works, and it is able to capture the maximum toughness increase as a function of nanoparticle size and concentration.

FIG. 3 shows normalized fracture toughness as a function of graphene nanoparticle volume fraction for different graphene nanoparticle sizes, and the predictions made by the invention are compared with available Compact Tension crack initiation toughness data for graphene nanoparticles size=2 and 5 μm (Example 3). As can be seen, reasonably good agreement with test data is observed. More interestingly, using data from the 2 and 5 micron tests, the method disclosed herein is able to predict that a maximum of 610% increase in matrix toughness is feasible by dispersing in it 0.1 micron size graphene nanoparticles at 0.003 volume fraction (shown by the peak of the cyan curve in FIG. 3), before particle agglomeration causes reduction in toughness at higher volume fractions. The predicted fracture toughness curves rise with increasing $V_{fGNP}$ and decreasing graphene nanoparticle size, indicating very good synergy between graphene nanoparticle size and volume fraction in improving toughness.

b) Orthotropic Case: Initiation Toughness Modeling for Orthotropic Polymer Matrix Composite Reinforced with Graphene Nanoparticles For an orthotropic fiber reinforced composite laminate with a delamination crack, path independence of J-integral dictates that at crack initiation in a linear elastic composite material the far-field and near-tip strain energy release rates (SERR) are equal:

$$G_{tip} = G_{N.C_{FF}} \tag{9}$$

where the expression for strain energy release rate for the orthotropic laminate is given by:

$$G_I = K_I^2\left(\frac{1}{2E_1E_2}\right)^{1/2}\left[\left(\frac{E_1}{E_2}\right)^{1/2} + \frac{E_1 - 2\gamma_{12}G_{12}}{2G_{12}}\right]^{1/2} \tag{10}$$

and where $E_1$, $E_2$, are composite orthotropic modulus in the fiber and transverse directions respectively, $G_{12}$ is the composite shear modulus and $\gamma_{12}$ is the Poisson's ratio.

From composite micromechanics:

$$\left.\begin{aligned} E_1 &= E_fV_f + E_mV_m \\ E_2 &= \frac{E_fE_m}{E_fV_m + E_mV_f} \\ \gamma_{12} &= \gamma_fV_f + \gamma_mV_m \\ G_{12} &= \frac{G_fG_m}{G_fV_m + G_mV_f} \end{aligned}\right\} \tag{11}$$

where, subscript "f" and "m" imply fiber and matrix mechanical properties respectively, and subscript "t" implies near-tip properties which are different from far-field properties due to micro-damage. Note that $V_f$ is the carbon-fiber volume fraction in the composite and is distinct from $V_{fGNP}$. Substituting Equation (10) in Equation (9), provides us with the ratio of the near-tip $K_{Itip}$ to the far-field $K_{IN.C.FF.}$, that is, the crack shielding effect:

$$\frac{K_{Itip}}{K_{IN.C.FF.}} = \left\{\frac{\left(\frac{1}{2E_1E_2}\right)^{1/2}\left[\left(\frac{E_1}{E_2}\right)^{1/2} + \frac{E_1 - 2\gamma_{12}G_{12}}{2G_{12}}\right]^{1/2}}{\left(\frac{1}{2E_{1t}E_{2t}}\right)^{1/2}\left[\left(\frac{E_{1t}}{E_{2t}}\right)^{1/2} + \frac{E_{1t} - 2\gamma_{12t}G_{12t}}{2G_{12t}}\right]^{1/2}}\right\} \tag{12}$$

Assuming similar near-tip toughness degradation behavior as before, and hence substituting Equation (7) and Equation (11) in Equation (10) and solving for the critical far-field strain energy release rate $G_{ICFF}$ gives:

$$G_{ICFF} = K_{ICM}^2(1 - V_f)^2\left(\frac{1}{2E_{1t}E_{2t}}\right)^{1/2}\left[\left(\frac{E_{1t}}{E_{2t}}\right)^{1/2} + \frac{E_{1t} - 2\gamma_{12t}G_{12t}}{2G_{12t}}\right]^{1/2} \tag{13}$$

Figure 4:
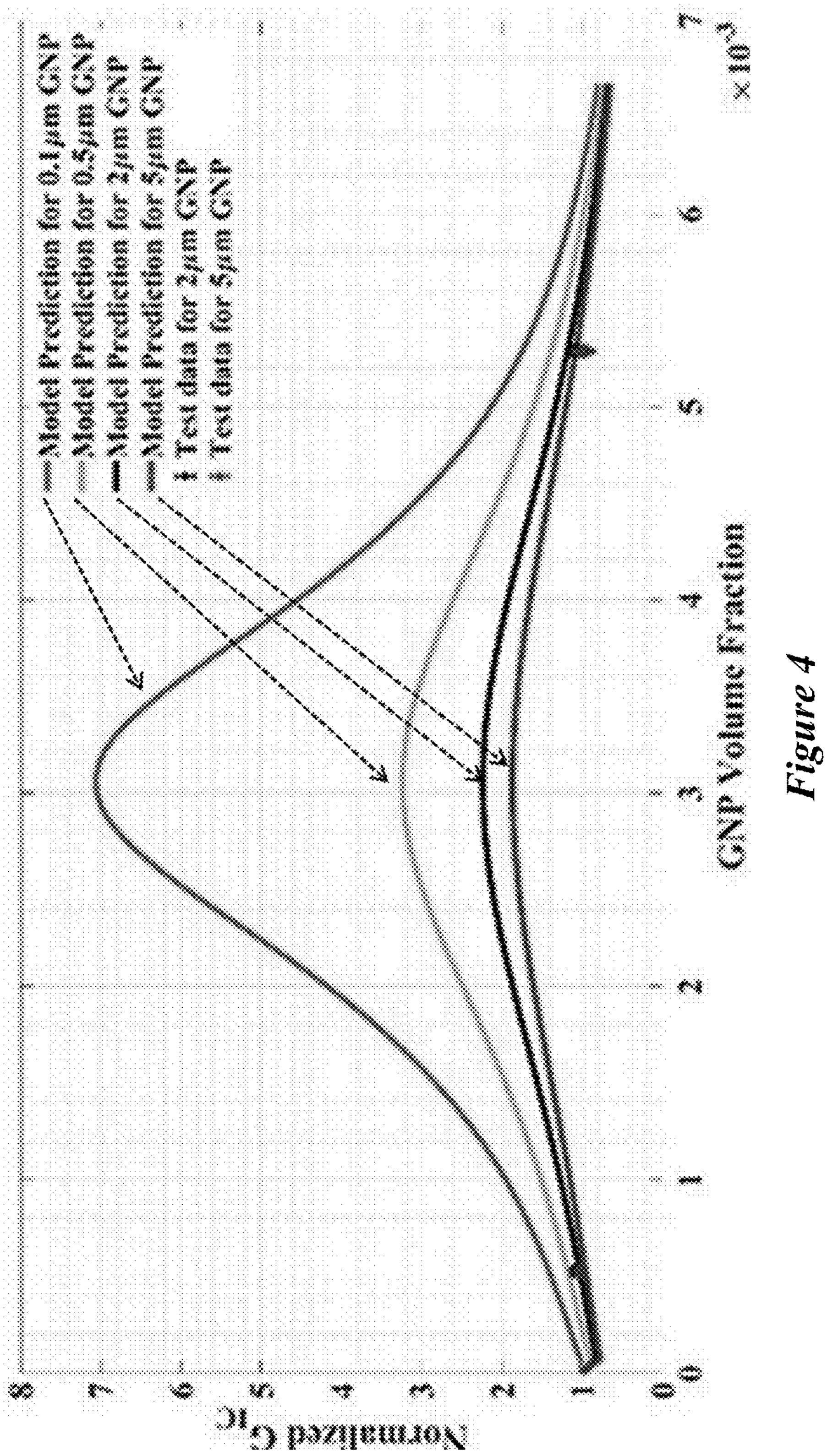
FIG. 4. Prediction of toughness for double cantilever beam (DCB) specimens.

All material properties in the fracture process zone, designated by the subscript "t" in Equation (13) are obtained by substituting $E_m = E_{epoxy}(1-\beta n^4)$ in Equation (11) to obtain $E_{1t}$, $E_{2t}$, etc. as input to Equation (13). Predictions for the normalized Mode I delamination fracture toughness for the orthotropic case using Equation (13) in a MATLAB algorithm are shown in FIG. 4 and are compared with available delamination initiation test data at room temperature (23° C.) (Example 3). Comparison with delamination fracture test data for orthotropic carbon/epoxy composite specimens with dispersed graphene nanoparticles indicates that the methods disclosed herein work.

FIG. 4 shows normalized delamination fracture toughness as a function of graphene nanoparticle volume fraction, and the predictions made by the methods disclosed herein are compared with available delamination initiation test data at room temperature (Example 3). Once again, excellent agreement with test data is observed at graphene nanoparticle volume fractions of 0.0005 and 0.0055, respectively. Further, FIG. 4 shows that, the methods disclosed herein are able to predict that the effect of crack tip shielding on delamination initiation toughness of unidirectional IM7/EPON862/GNP composite laminate can be fully exploited and increased by an unprecedented 700% over the baseline case by reducing graphene nanoparticle size to 0.1 μm (shown by the peak of the cyan curve in FIG. 4), with the peak toughness occurring at a volume fraction of graphene nanoparticles of 0.003 before particle agglomeration can cause toughness degradation. The reason that the delamination toughness enhancement is even greater for the orthotropic composite than that in the isotropic epoxy case, even though the micro-cracked matrix modulus ($E_{tip}$) is the same for both cases, can be due to a greater synergistic interaction between laminate orthotropy, microcracks in the fracture process zone, graphene nanoparticle number density, and graphene nanoparticle size at relatively higher values of $V_{fGNP}$, as evidenced by the sharp rise in normalized initiation toughness for $V_{fGNP}>0.0025$ in FIG. 4. Verification of the prediction methods for graphene nanoparticle size of 0.1 micron has not been carried out yet, because it requires a special ball-milling machine to reduce the graphene nanoparticle to 0.1 micron size. However, the good agreement with test data for graphene nanoparticle sizes of 2 and 5 micron gives confidence in the predictive capabilities of the methods disclosed herein. It should be noted that the optimum values shown in FIG. 3 and FIG. 4 are only valid for the given material system (IM7/EPON862/GNP). However, the methods disclosed herein can be readily applied to a new composite material system following the procedure outlined above.

Potential Applications

The composites industry is an economic force that fuels the American economy. Annually, this industry contributes $22.2 billion to the US economy. By 2022, the end-product market for composites is expected to reach $113.2 billion. This includes aerospace, automotive, sporting goods, boating, and wind energy industries, just to name a few. The application of nanofiller reinforced materials as described herein can significantly impact the structural design of future aerospace and automotive platforms including airframes, space vehicles, satellites, and a multitude of load-bearing systems while reducing the cost of materials development by greatly reducing trial-and-error testing.

Because only ~0.5 wt. % of nanofiller is needed for maximizing toughness, the influence of material cost and weight penalty should be minimal from a process scale-up perspective.

Toyota Motors has been incorporating nanoclay particles in car bumpers for improved impact strength since the early 1990s, but has not used nanocomposites in primary structures due to a lack of clear understanding of its fracture behavior. Boeing has recently used nanoparticle coatings on helicopter rotor blades for improved erosion resistance, but again, not in primary structures.

Maximizing fracture toughness using graphene nanoparticle nanofillers in conjunction with a better understanding of the underlying crack shielding mechanism has the potential to increase the flaw tolerance of the composite material (including manufacturing flaws), facilitating damage tolerant design of structures and provide significant benefit in weight reduction without expensive trial-and-error based testing. The implementation of the methods disclosed herein can be applied for fracture and fatigue analysis for other advanced aerospace and automotive systems. The successful development and implementation of the methods disclosed herein can further reduce the weight of aerospace and automotive structures, thus reducing use of fuel and lowering $CO_2$ emissions, thereby contributing to a lower carbon footprint that can help mitigate ecological pressures.

Example 3

Dispersed graphene nanoparticles can form templates for microcracks to form in the fracture process zone (FPZ), which helps shield the crack tip (FIG. 1). Hence the higher the graphene nanoparticle number density (Equation (2)) the better the shielding.

The methods disclosed herein include three concepts: (1) it identifies the graphene nanoparticle number density as the metric for toughness enhancement (as opposed to graphene nanoparticle weight percent); (2) it utilizes crack-shielding effect based on graphene nanoparticle number density to obtain "toughness vs. graphene nanoparticle volume fraction curves" for available graphene nanoparticle sizes (using only 7 data points) and pin-points the peak; and (3) it obtains fracture mechanics-based prediction of optimum toughness for very small graphene nanoparticle sizes outside of the experimental data set (not just data extrapolation). The methodology can predict the effect of nanoparticle size and concentration (n) on fracture toughness, and pin-point the optimum toughness enhancement.

An advantage of the methods disclosed herein is that the methods can eliminate the expensive trial-and-error based testing approach and instead can pin-point the location of the maximum toughness increase using only a few (~7) experimental data points. While graphene nanoparticle reinforced materials are known, no true predictive tool for optimizing graphene nanoparticle reinforcement exists prior to this work.

Because less than 0.5 wt. % of the nanofiller is needed for maximizing toughness, the influence of added material cost and weight penalty are minimal from a process scale-up perspective.

Macro Scale Fracture Experiments

Figure 5:
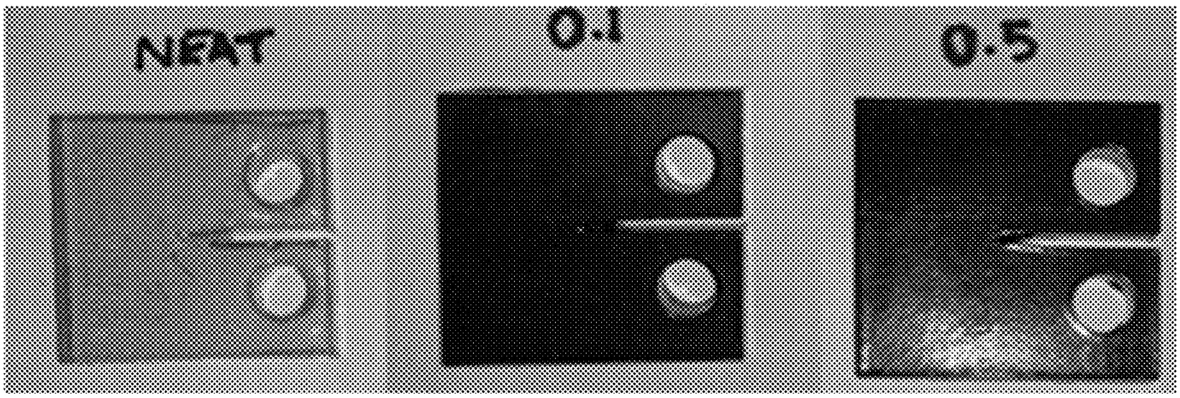
FIG. 5. Photograph of example compact tension (CT) specimens for the neat epoxy (left), composite with 0.1 wt. % graphene nanoparticles (middle), and composite with 0.5 wt. % graphene nanoparticles (right).

Compact tension (CT) tests were performed for three different graphene nanoparticle sizes (median size 2, 5, and 15 microns) for 0.1 wt. %, 0.5 wt. %, and 1.25 wt. % in epoxy, respectively. High shear mixing and sonication was used to disperse the graphene nanoparticles in the epoxy to make compact tension specimens. Four replicate 1.2 inch×1.2 inch×0.25 inch compact tension specimens and clevis were machined according to ASTM D5045-99 standard procedure. Photographs of example specimens are shown in FIG. 5.

Figure 6:
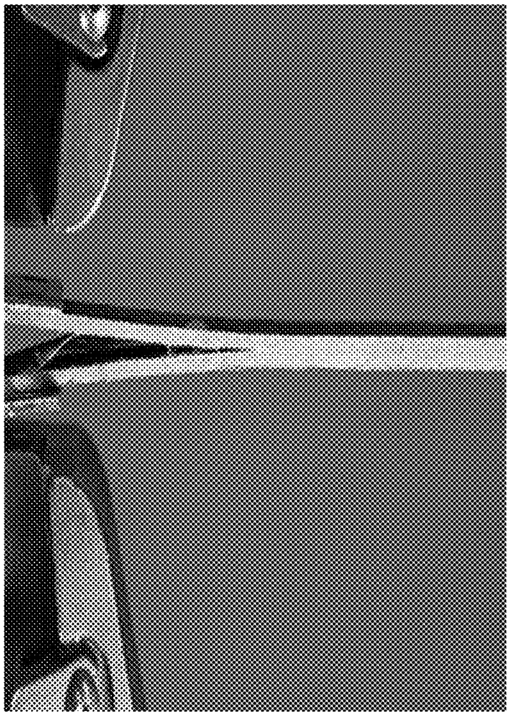
FIG. 6. Photograph of example double cantilever beam tests.
Figure 7:
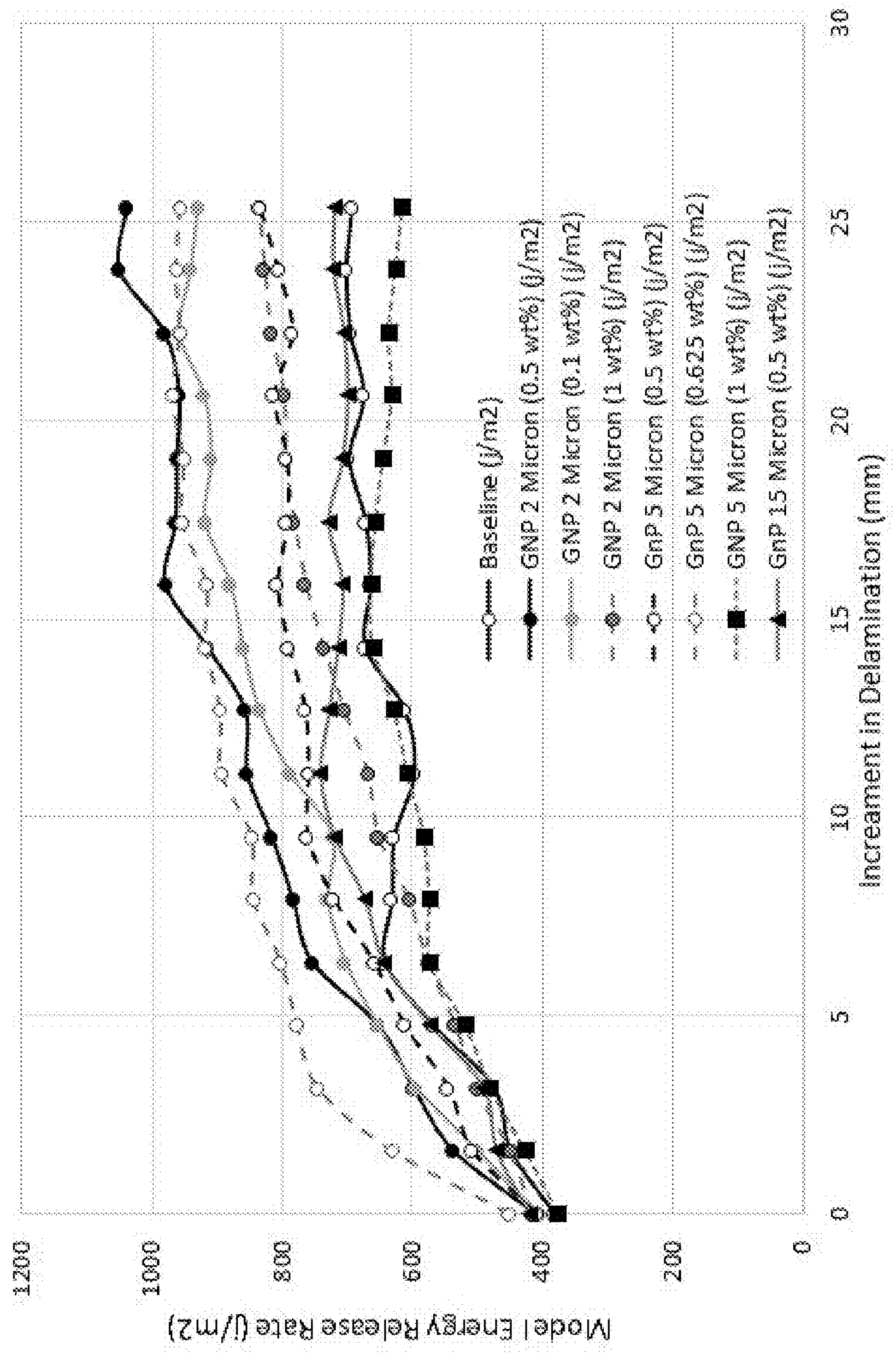
FIG. 7. Results from double cantilever beam tests of unidirectional IM7/EPON-862 laminates with graphene nanoparticles.

Double Cantilever Beam (DCB) tests (FIG. 6) were performed to measure Mode I delamination toughness for three different graphene nanoparticle sizes (median size 2, 5, and 15 microns) for 0.1 wt. %, 0.5 wt. %, and 1. Wt. % in epoxy, respectively (Roy et al. Composite Structures, 2017, 181, 1-8). Unidirectional IM7/EPON-862 laminates were tested as per ASTM D5528 with graphene nanoparticles, showing an increase in crack growth resistance with decreasing graphene nanoparticle size (FIG. 7).

Figure 8:
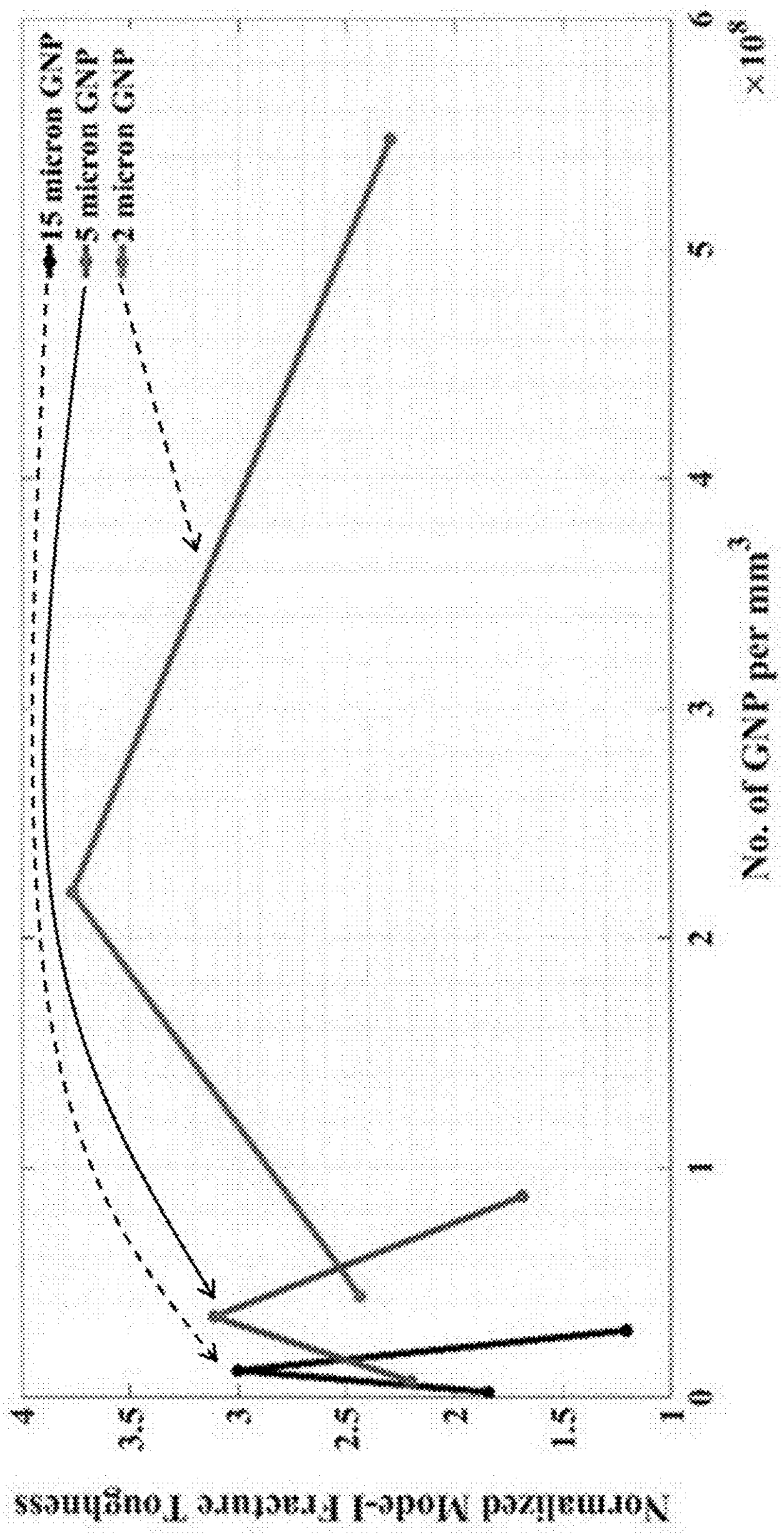
FIG. 8. Normalized mode I toughness of EPON862/GNP compact tension specimens as a function graphene nanoparticle number density (n).

The normalized mode I toughness of EPON862/GNP compact tension specimens as a function graphene nanoparticle number density (n) are shown in FIG. 8. The fracture toughness shows an inverted V-shape with graphene nanoparticle number density. Also, the toughness increases with decreasing graphene nanoparticle size. A synergistic combination of lower graphene nanoparticle size and higher graphene nanoparticle number density results in greater toughness increase by allowing greater crack shielding before particle agglomeration can set in.

Figure 9:
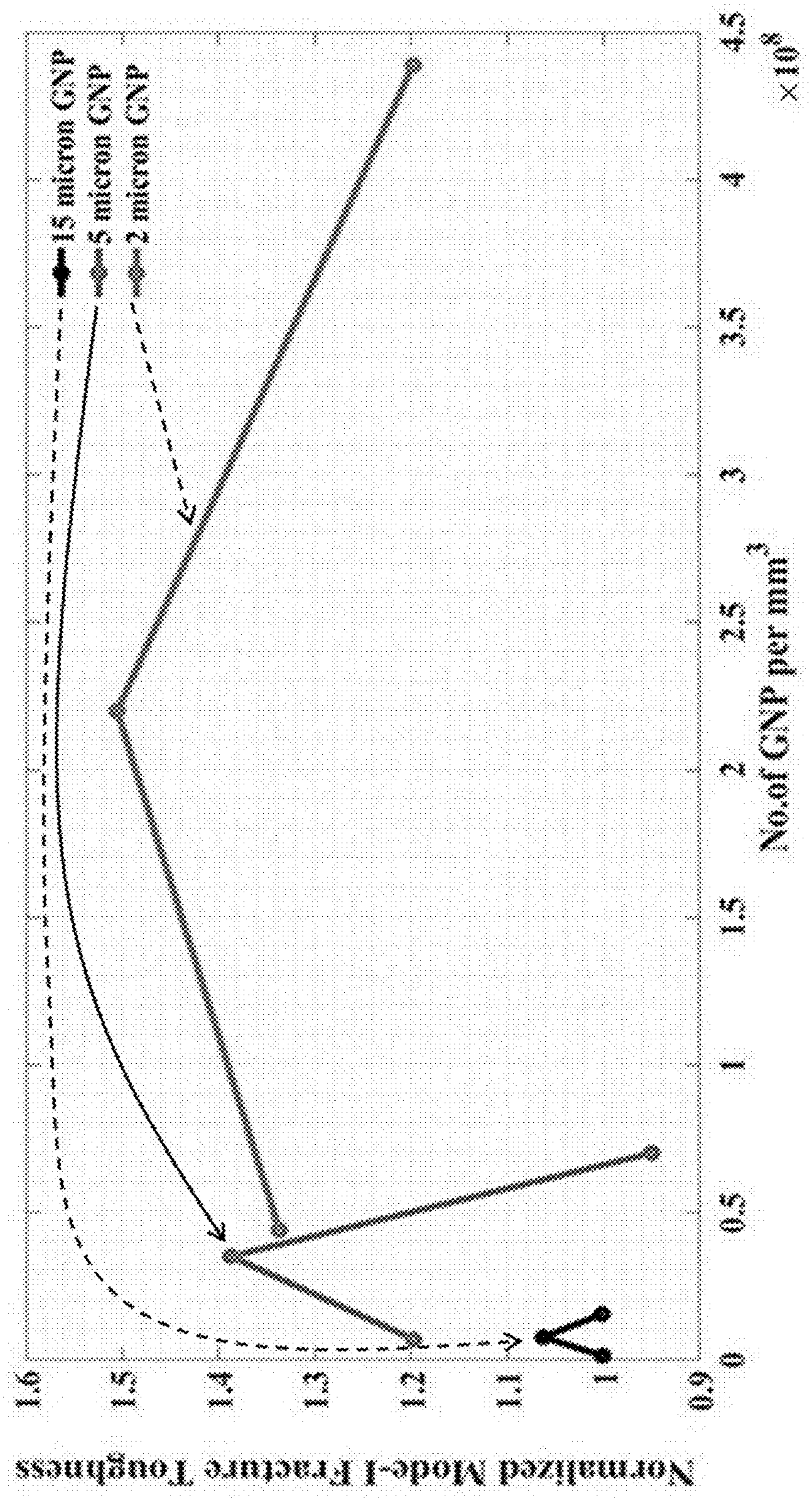
FIG. 9. Mode I delamination toughness in IM7/EPON862/GNP laminates as a function of number of graphene nanoparticles.

The mode I delamination toughness in IM7/EPON862/GNP composite laminates as a function of number of graphene nanoparticles is shown in FIG. 9. Peak mode I delamination toughness increases with decreasing median particle size. A synergistic combination of lower graphene nanoparticle size and high graphene nanoparticle number density results in greater toughness increase by allowing grater crack shielding before particle agglomeration can set in.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The compositions, methods, and systems of the appended claims are not limited in scope by the specific compositions, methods, and systems described herein, which are intended as illustrations of a few aspects of the claims and any methods that are functionally equivalent are intended to fall within the scope of the claims. Various modifications of the compositions, methods, and systems in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A method for designing a proposed isotropic composite material with a particular fracture toughness or a proposed orthotropic composite material with a particular delamination toughness, the method comprising:

receiving, using a processing device, a measured fracture toughness value for a matrix material;

receiving, using the processing device, a plurality of measured fracture toughness values of a plurality of isotropic composite materials or a plurality of measured delamination toughness values of a plurality of orthotropic composite materials;

wherein the plurality of isotropic composite materials each comprise a first reinforcing material dispersed throughout the matrix material;

wherein the plurality of orthotropic materials each comprise the first reinforcing material and a second reinforcing material dispersed throughout the matrix material;

wherein the first reinforcing material comprises a plurality of particles;

wherein the second reinforcing material comprises a plurality of fibers;

wherein, for each of the plurality of isotropic composite materials, the first reinforcing material has a median particle size and a median particle thickness, and each of the isotropic composite materials includes the first reinforcing material at a volume fraction and a number density, and wherein the plurality of isotropic materials each has a different volume fraction, number density, median particle size, median particle thickness, or combination thereof;

wherein, for each of the plurality of orthotropic composite materials, the first reinforcing material has a median particle size and a median particle thickness, and each of the orthotropic composite materials includes the first reinforcing material at a volume fraction and a number density, and the plurality of orthotropic materials each has a different volume fraction, number density, median particle size, median particle thickness, or combination thereof;

optionally storing, using the processing device, the measured fracture toughness value for the matrix material, and the plurality of measured fracture toughness values of the plurality of isotropic composite materials or the plurality of measured delamination toughness values of the plurality of orthotropic composite materials; and determining, using the processing device, the median particle size and volume fraction that achieves the particular fracture toughness in the proposed isotropic composite material or the particular delamination toughness in the proposed orthotropic composite material using a fracture mechanics based model that incorporates the effects of crack-tip shielding due to microcracking induced by the first reinforcing material and local toughness degradation in a fracture process zone;

wherein the proposed isotropic composite material has a particular mode I fracture toughness or wherein the proposed orthotropic composite material has a particular mode I delamination toughness, the method comprising:

measuring the mode I fracture toughness of the matrix material, wherein the matrix material has an elastic modulus;

measuring the mode I facture toughness of at least nine different isotropic composite materials;

wherein each isotropic composite material comprises a first reinforcing material dispersed throughout the matrix material, wherein the first reinforcing material comprises a plurality of particles;

wherein, for each of the at least nine different isotropic materials, the first reinforcing material has a median particle size and a median particle thickness;

wherein each of the nine different isotropic materials includes the first reinforcing material at a volume fraction and a number density; wherein the at least nine different isotropic composite materials includes at least three sets of isotropic composite materials;

wherein, for each set, the first reinforcing material has a particular median particle size, and each set includes at least three different isotropic composite materials, each having a particular volume fraction of the first reinforcing material having the particular median particle size, wherein the particular volume fraction is different for each of the at least three different isotropic composite materials in the set, such that each set of isotropic composite materials includes at least three different volume fractions of the first reinforcing material having the particular median particle size;

wherein the particular median particle size is different for each of the at least three sets of isotropic composite materials, such that the at least nine different isotropic composite materials includes at least three different median particle sizes;

using the measured mode I fracture toughness of the matrix material and the measured mode I facture toughness of at least nine isotropic composite material samples in Equation (A) below to determine power-law parameters β and q:

$$\left(K_{IC\ brittle}^2 \middle/ K_{IC\ composite}^2\right) = (1-\beta n^q) \quad \text{(A)}$$

wherein $K_{IC\ brittle}$ is measured value of the mode I toughness for the matrix material;

$K_{IC\ composite}$ is the measured value of the mode I toughness for the isotropic composite materials; and n is the number density of the first reinforcing material in the isotropic composite materials;

and for designing the proposed isotropic composite material, using the determined power-law parameters β and q and the measured value of the mode I toughness of the matrix material in equation (B) below to determine the volume fraction, the median particle size, and the median particle thickness of the first reinforcing material that achieves the particular mode I fracture toughness for the proposed isotropic composite material:

$$K_{IC\ composite} = K_{IC\ brittle}(1 - V_{f\ reinforc})\left(\frac{1}{\sqrt{1-\beta\left(\frac{V_{f\ reinforc}}{l^2 t}\right)^q}}\right) \quad \text{(B)}$$

wherein $K_{IC\ brittle}$ is measured value of the mode I toughness for the matrix material;

$V_{freinforc}$ is the volume fraction of the first reinforcing material;

l is the median particle size of the first reinforcing material;

t is the median particle thickness of the first reinforcing material; and $K_{IC\ composite}$ is the particular mode I fracture toughness for the proposed isotropic composite material;

or for designing the proposed orthotropic composite material:

the proposed orthotropic composite material comprising the first reinforcing material and a second reinforcing material dispersed throughout the matrix material;

the second reinforcing material comprising a plurality of fibers and having an elastic modulus, a shear modulus, and a Poisson's ratio;

the proposed orthotropic composite material comprising the second reinforcing material and the matrix material each at a particular volume fraction;

using the determined power-law parameters β and q and the measured value of the mode I toughness of the matrix material in the equations below to determine the particular volume fraction, the median particle size, and the median particle thickness of the first reinforcing material that achieves the particular mode I delamination toughness for the proposed orthotropic composite material:

$$G_{IC\ composite} = K_{IC\ brittle}(1 - V_{fiber})^2\left(\frac{1}{2E_1E_2}\right)^{1/2}\left[\left(\frac{E_1}{E_2}\right)^{1/2} + \left(\frac{E_1 - 2\gamma_{12}G_{12}}{2G_{12}}\right)\right]^{1/2}$$

$$E_1 = E_f V_f + E_m V_m$$

$$E_2 = \frac{E_f E_m}{E_f V_m + E_m V_{fiber}}$$

$$\gamma_{12} = \gamma_f V_{fiber} + \gamma_m V_m$$

$$G_{12} = \frac{G_f G_m}{G_f V_m + G_m V_{fiber}}$$

$$E_m = E_{brittle}\left(1 - \beta\left(\frac{V_{f\ reinforc}}{l^2 t}\right)^q\right)$$

wherein $G_{IC\ composite}$ is the particular mode I delamination toughness for the proposed orthotropic composite material;

$K_{IC\ brittle}$ is measured value of the mode I toughness for the matrix material;

$V_{fiber}$ is the particular volume fraction of the second reinforcing material in the proposed orthotropic composite material;

$E_f$ is the elastic modulus of the second reinforcing material;

$V_m$ is the particular volume fraction of the matrix material in the proposed orthotropic composite material;

$\gamma_f$ is Poisson's ratio of the second reinforcing material;

$\gamma_m$ is Poisson's ratio of the matrix material;

$G_f$ is the shear modulus of the second reinforcing material;

$G_m$ is the shear modulus of the matrix material;

$E_{brittle}$ is the elastic modulus of the matrix material;

$V_{f\ reinforc}$ is the volume fraction of the first reinforcing material;

l is the median particle size of the first reinforcing material; and t is the median particle thickness of the first reinforcing material.

2. The method of claim 1, wherein the method further comprises measuring the fracture toughness of the matrix material.

3. The method of claim 1, wherein the method further comprises measuring the fracture toughness of the plurality of isotropic composite materials or measuring the delamination toughness of the plurality of orthotropic composite materials as a function of median particle size and volume fraction.

4. The method of claim 1, wherein the plurality of isotropic composite materials includes at least nine different isotropic composite materials or wherein the plurality of orthotropic composite materials includes at least nine different isotropic composite materials.

5. The method of claim 1, wherein the particular fracture toughness of proposed isotropic composite material is the maximum fracture toughness or wherein the particular delamination toughness of the proposed orthotropic composite material is the maximum fracture toughness.

6. The method of claim 1, wherein:

the method comprises designing the proposed isotropic composite material and the particular mode I fracture toughness is the maximum mode I fracture toughness for the proposed isotropic composite material; or the method comprises designing the proposed orthotropic composite material and the particular mode I delamination toughness is the maximum mode I delamination toughness for the proposed orthotropic composite material.

7. The method of claim 6, further comprising determining the elastic modulus of the matrix material.

8. The method of claim 6, further comprising determining the volume fraction of the first reinforcing material in each of the at least nine isotropic composite materials.

9. The method of claim 8, wherein the volume fraction of the first reinforcing material is determined using Equation (C):

$$V_{f\ reinforc} = \frac{\rho_{brittle} w_{reinforc}}{\rho_{brittle} w_{reinforc} + \rho_{reinforc}} \quad \text{(C)}$$

wherein $V_{f\ reinforc}$ is the volume fraction of the first reinforcing material in the isotropic composite material;

$\rho_{brittle}$ is the mass density of the matrix material;

$w_{reinforc}$ is the weight fraction of the first reinforcing material in the isotropic composite material; and $\rho_{reinforc}$ is the mass density of the first reinforcing material.

10. The method of claim 6, further comprising determining the number density of the first reinforcing material in each of the at least nine isotropic composite materials.

11. The method of claim 10, wherein the number density of the first reinforcing material is determined using equation (D):

$$n = \frac{V_{f\ reinforc}}{V_p} = \frac{V_{f\ reinforc}}{tl^2} \quad \text{(D)}$$

wherein $V_{f\ reinforc}$ is the volume fraction of the first reinforcing material in the isotropic composite material;

$V_p$ is median volume of the plurality of particles comprising the first reinforcing material;

t is the median thickness of the plurality of particles comprising the first reinforcing material; and l is the median particle size of the plurality of particles comprising the first reinforcing material.

12. The method of claim 6, wherein the mode I fracture toughness of the matrix material and/or the at least nine different isotropic composite materials are measured according to ASTM D5045 standard test procedure.

13. The method of claim 1, wherein the brittle matrix material comprises a polymer or glass.

14. The method of claim 1, wherein the plurality of particles of the first reinforcing material and/or the plurality of fibers of the second reinforcing material independently comprise a metal oxide, a metal carbide, a carbonaceous or graphitic material, silica based materials, or a combination thereof.

15. The method of claim 1, wherein the plurality of particles of the first reinforcing material have a flat, plate like 2D structure; wherein the plurality of particles of the first reinforcing material have a median particle size of from 50 nanometers to 50 micrometers; or a combination thereof.

16. The method of claim 1, wherein the volume fraction of the first reinforcing material is from greater than 0 to 0.010; wherein the number density of the first reinforcing material is from greater than 0 to $1\times10^9$ particles/mm$^3$; or a combination thereof.

17. A proposed isotropic composite material and/or a proposed orthotropic composite material designed by the method of claim 1.

18. An object or article of manufacture comprising the proposed isotropic composite material and/or the proposed orthotropic composite material of claim 17.

* * * * *